United States Patent
Piontek et al.

(10) Patent No.: US 11,614,195 B2
(45) Date of Patent: Mar. 28, 2023

(54) EXTENDED RANGE ENCAPSULATION SHELL

(71) Applicant: Total Piping Solutions, Inc., Olean, NY (US)

(72) Inventors: Daryl M. Piontek, Great Valley, NY (US); Richard Fontes, Springville, NY (US)

(73) Assignee: Dresser TPS, LLC, Houston, TX (US)

( * ) Notice: Subject to any disclaimer, the term of this patent is extended or adjusted under 35 U.S.C. 154(b) by 97 days.

(21) Appl. No.: 16/660,951

(22) Filed: Oct. 23, 2019

(65) Prior Publication Data

US 2020/0149666 A1 May 14, 2020

Related U.S. Application Data

(60) Provisional application No. 62/760,550, filed on Nov. 13, 2018.

(51) Int. Cl.
| | |
|---|---|
| *F16L 55/172* | (2006.01) |
| *F16L 21/06* | (2006.01) |
| *F16L 19/02* | (2006.01) |
| *F16L 21/02* | (2006.01) |
| *F16L 21/04* | (2006.01) |

(52) U.S. Cl.
CPC ............ *F16L 55/172* (2013.01); *F16L 21/06* (2013.01); *F16L 19/02* (2013.01); *F16L 21/022* (2013.01); *F16L 21/04* (2013.01)

(58) Field of Classification Search
CPC .......... F16L 17/04; F16L 21/065; F16L 55/18
See application file for complete search history.

(56) References Cited

U.S. PATENT DOCUMENTS

| | | | |
|---|---|---|---|
| 2,286,751 A | | 6/1942 | Merrill |
| 3,078,108 A | * | 2/1963 | Smith ..................... F16L 21/06 |
| | | | 285/104 |
| 3,861,422 A | * | 1/1975 | Christie ................ F16L 55/172 |
| | | | 174/92 |
| 4,391,458 A | | 7/1983 | Blakeley |
| (Continued) | | | |

OTHER PUBLICATIONS

U. S. Patent and Trademark Office (ISA/US), International Search Report and Written Opinion from International Application No. PCT/US19/57521, completed Dec. 2, 2019; dated Jan. 14, 2020.

*Primary Examiner* — Zachary T Dragicevich
*Assistant Examiner* — Alexander T Rufrano
(74) *Attorney, Agent, or Firm* — Harter Secrest & Emery LLP

(57) ABSTRACT

A conduit coupling assembly having first and second sleeve members configured to be tightened to a fluid conduit, an arcuate radial split gasket configured to be positioned between the first and second sleeve members and the fluid conduit, the first sleeve member having an inwardly-facing arcuate radial surface with first and second arcuate portions and a third arcuate portion between the first and second arcuate portions that has a radius from the longitudinal axis of the pipe that is less than the radius of the first and second arcuate portions, and the second sleeve member having an inwardly-facing arcuate radial surface with first and second arcuate portions and a third arcuate portion between the first and second arcuate portions that has a radius from the longitudinal axis of the pipe that is less than the radius of the first and second arcuate portions.

24 Claims, 15 Drawing Sheets

(56) References Cited

U.S. PATENT DOCUMENTS

| | | | | |
|---|---|---|---|---|
| 5,354,108 | A * | 10/1994 | Sandor | F16L 17/04 |
| | | | | 285/414 |
| 5,884,003 | A * | 3/1999 | Cloud | G02B 6/4446 |
| | | | | 385/135 |
| 6,065,784 | A * | 5/2000 | Lundstrom | F16L 47/12 |
| | | | | 285/368 |
| 6,168,210 | B1 | 1/2001 | Bird | |
| 7,464,728 | B2 * | 12/2008 | Cairns | F16L 55/17 |
| | | | | 138/155 |
| 7,726,703 | B2 * | 6/2010 | Porter | F16L 23/08 |
| | | | | 285/420 |
| 8,776,351 | B2 | 7/2014 | Bird et al. | |
| 9,182,058 | B2 * | 11/2015 | Cygler, III | F16L 43/00 |
| 9,310,002 | B2 * | 4/2016 | Chiproot | F16J 15/025 |
| 9,395,024 | B2 * | 7/2016 | Bancroft | F16L 21/005 |
| 10,100,957 | B2 * | 10/2018 | Bowman | F16L 17/04 |
| 10,234,066 | B2 | 3/2019 | Patriarca | |
| 10,260,668 | B2 * | 4/2019 | Chiproot | F16L 55/178 |
| 10,557,588 | B2 * | 2/2020 | Chiproot | F16L 23/167 |
| 2007/0044858 | A1 | 3/2007 | Cairns | |
| 2008/0048444 | A1 | 2/2008 | Porter et al. | |
| 2010/0327576 | A1 | 12/2010 | Linhorst et al. | |
| 2010/0327675 | A1 | 12/2010 | Chen | |
| 2014/0070529 | A1 | 3/2014 | Bancroft et al. | |
| 2015/0176728 | A1 | 6/2015 | Bowman | |
| 2018/0156367 | A1 | 6/2018 | Piontek et al. | |
| 2019/0331265 | A1 * | 10/2019 | Bowman | F16L 37/088 |

\* cited by examiner

SECTION A:A

SECTION A:A

SECTION B:B

SECTION B:B

SECTION C:C

SECTION D:D

EXTENDED RANGE ENCAPSULATION SHELL

TECHNICAL FIELD

The present invention relates generally to the field of fluid conduit repair and coupling sleeves, and more particularly to an improved pipe coupling sleeve.

BACKGROUND ART

Split repair and encapsulating sleeves or clamps are used in the repair or reinforcement of pipes. For example, conventional assemblies for coupling and sealing adjacent ends of two adjacent pipe sections include a sleeve, shell or collar with each pipe end extending into a respective end of the sleeve. Gaskets are placed between the sleeve and each pipe end, respectively, such that tightening the sleeve to the pipe sections compresses the gasket against the pipe ends, thereby sealing the pipe coupling to the pipes.

U.S. Pat. No. 6,168,210, entitled "Pipe Coupling," discloses a sleeve, flanges and gaskets that are coupled together via bolts to compress the gaskets against pipe ends as the flanges are drawn towards each other. U.S. Pat. No. 4,391,458, entitled "Pipe Coupling with Gasket Locating Means," discloses a pipe coupling having a split housing surrounding a split-ring gasket. U.S. Patent Application Publication No. 2010/0327576, entitled "Pipe Coupler and Gasket with Positive Retention and Sealing Capability," discloses a coupler which provides positive retention of a gasket about the circumference of the coupler. U.S. Pat. No. 8,776,351, entitled "Split-Ring Gland Pipe Coupling with Corrugated Armor," discloses a pipe coupling for coupling adjacent ends of a pair of pipes that includes a sleeve, a split-ring gland positioned around one of the ends of the sleeve, and an annular gasket positioned within the split-ring gland and configured to be compressed by the split-ring gland for sealing one pipe end to the sleeve.

BRIEF SUMMARY

With parenthetical reference to corresponding parts, portions or surfaces of the disclosed embodiment, merely for the purposes of illustration and not by way of limitation, an improved conduit coupling assembly (15) configured to clamp to a fluid conduit (19, 119) oriented about a longitudinal axis (x-x) is provided comprising: a first arcuate sleeve member (16A); a second arcuate sleeve member (16B); a connecting assembly (18) coupling the first sleeve member to the second sleeve member and configured to tighten the first and second sleeve members to the fluid conduit from a non-actuated position (FIG. 9, FIG. 12) to a tightened position (FIG. 11, FIG. 13); an arcuate gasket (25, 25A) having a radial-split (27) and configured to be positioned between the first and second sleeve members and the fluid conduit; the gasket having an outer arcuate surface (26); the first arcuate sleeve member having a first longitudinally extending edge (28), a second longitudinally extending edge (28A), and a first inwardly-facing arcuate pocket (45) curving about the longitudinal axis from the first longitudinally extending edge to the second longitudinally extending edge when the first and second sleeve members are in the tightened position, the first inwardly-facing arcuate pocket configured to receive a portion of the radial-split gasket; the first arcuate pocket having an inwardly-facing arcuate surface (48) when the first and second sleeve members are in the tightened position comprising: a first arcuate portion (48A), a second arcuate portion (48C), and a third arcuate portion (48B); the third arcuate portion positioned circumferentially between the first and second arcuate portions; the first arcuate portion positioned circumferentially between the first longitudinally extending edge and the third arcuate portion; the second arcuate portion positioned circumferentially between the second longitudinally extending edge and the third arcuate portion; the first arcuate portion having a maximum radius (31A) from the longitudinal axis; the second arcuate portion having a maximum radius (31C) from the longitudinal axis; the third arcuate portion having a minimum radius (30A) from said longitudinal axis; the maximum radius (31A) of the first arcuate portion being greater than the minimum radius (30A) of the third arcuate portion; the maximum radius (31C) of the second arcuate portion being greater than the minimum radius (30A) of the third arcuate portion; the second arcuate sleeve member having a first longitudinally extending edge (29), a second longitudinally extending edge (29A), and a second inwardly-facing arcuate pocket (50) curving about the longitudinal axis from the first longitudinally extending edge to the second longitudinally extending edge when the first and second sleeve members are in the tightened position, the second inwardly-facing arcuate pocket configured to receive a portion of the radial-split gasket; the second arcuate pocket having an inwardly-facing arcuate surface (53) when the first and second sleeve members are in the tightened position comprising: a first arcuate portion (53A), a second arcuate portion (53C), and a third arcuate portion (53B); the third arcuate portion positioned circumferentially between the first and second arcuate portions; the first arcuate portion positioned circumferentially between the first longitudinally extending edge and the third arcuate portion; the second arcuate portion positioned circumferentially between the second longitudinally extending edge and the third arcuate portion; the first arcuate portion having a maximum radius (32A) from the longitudinal axis; the second arcuate portion having a maximum radius (32C) from the longitudinal axis; the third arcuate portion having a minimum radius (30B) from the longitudinal axis; the maximum radius (32A) of the first arcuate portion being greater than the minimum radius (30B) of the third arcuate portion; and the maximum radius (32C) of the second arcuate portion being greater than the minimum radius (30B) of the third arcuate portion.

The outer arcuate surface (26) of the gasket may extend from a first edge of the radial-split to a second edge of the radial split and may have a constant radius from the first edge of the radial-split to a second edge of the radial split when the first and second sleeve members are in the non-actuated position. The conduit coupling assembly may comprise a first gap (36) between the outer arcuate surface of the gasket (26) and the first arcuate portions (48A, 53A) of the inwardly-facing arcuate surfaces (48, 53) of the first and second arcuate pockets (45, 50) of the first and second sleeve members when the first and second sleeve members are in the non-actuated position. The conduit coupling assembly may comprise a second gap (37) between the outer arcuate surface of the gasket (26) and the second arcuate portions (48C, 53C) of the inwardly-facing arcuate surfaces (48, 53) of the first and second arcuate pockets (45, 50) of the first and second sleeve members when the first and second sleeve members are in the non-actuated position. The third arcuate portion (48B) of the inwardly-facing arcuate surface of the first inwardly-facing arcuate pocket (45) of the first sleeve member may comprise a third non-circular arc about the longitudinal axis (x-x) having a third arc angle (33B) about said longitudinal axis and a radius from said longitudinal axis ranging from said minimum radius (30A) of said third arcuate portion to a maximum radius (36A, 36B) of said third arcuate portion. The third arcuate portion (48B) of said inwardly-facing arcuate surface of said first inwardly-facing arcuate pocket of said first sleeve member may comprise a third circular arc about a third center axis (80) offset radially from said longitudinal axis, said third circular arc having a constant radius (80C) from said third central axis (80) that is less than said minimum radius (30A) of said third arcuate portion from said longitudinal axis (x-x) and a third central axis arc angle (80D) greater than said third arc angle (33B).

The first arcuate portion (48A) of said inwardly-facing arcuate surface of said first inwardly-facing arcuate pocket of said first sleeve member may comprise a non-circular arc about said longitudinal axis (x-x) having a first arc angle (33A) about said longitudinal axis and a radius from said longitudinal axis ranging from said maximum radius (31A) of said first arcuate portion to a minimum radius (36A) of said first arcuate portion. The minimum radius (36A) of said first arcuate portion (48A) may be greater than said minimum radius (30A) of said third arcuate portion (48B). The minimum radius (36A) of said first arcuate portion (48A) may be equal to or greater than a maximum radius (36A) of said third arcuate portion (48B) from said longitudinal axis (x-x). The first arcuate portion (48A) of said inwardly-facing arcuate surface of said first inwardly-facing arcuate pocket of said first sleeve member may comprise a first circular arc about a first center axis (82) offset radially from said longitudinal axis (x-x), said first circular arc having a constant radius (82C) from said first central axis (82) that is less than said minimum radius (36A) of said first arcuate portion (48A) from said longitudinal axis (x-x) and a first central axis arc angle (82D) greater than said first arc angle (33A).

The second arcuate portion (48C) of said inwardly-facing arcuate surface of said first inwardly-facing arcuate pocket of said first sleeve member may comprise a non-circular arc about said longitudinal axis (x-x) having a second arc angle (33C) about said longitudinal axis (x-x) and a radius from said longitudinal axis ranging from said maximum radius (31C) of said second arcuate portion (48C) to a minimum radius (36B) of said second arcuate portion (48C). The minimum radius (36B) of said second arcuate portion (48C) may be greater than said minimum radius (30A) of said third arcuate portion (48B). The minimum radius (36B) of said second arcuate portion (48C) may be equal to or greater than a maximum radius (36B) of said third arcuate portion (48B) from said longitudinal axis (x-x). The second arcuate portion (48C) of said inwardly-facing arcuate surface of said first inwardly-facing arcuate pocket of said first sleeve member may comprise a second circular arc about a second center axis (83) offset radially from said longitudinal axis (x-x), said second circular arc having a constant radius (83C) from said second central axis (83) that is less than said minimum radius (36B) of said second arcuate portion (48C) from said longitudinal axis (x-x) and a second central axis arc angle (83D) greater than said second arc angle (33C).

The connecting assembly coupling the first sleeve member to the second sleeve member may comprise: a first connecting flange (23) extending from the first arcuate sleeve member adjacent the first longitudinally extending edge of the first arcuate sleeve member; a second connecting flange (23A) extending from the first arcuate sleeve member adjacent the second longitudinally extending edge of the first arcuate sleeve member; a first connecting flange (24) extending from the second arcuate sleeve member adjacent the first longitudinally extending edge of the second arcuate sleeve member; a second connecting flange (24A) extending from the second arcuate sleeve member adjacent the second longitudinally extending edge of the second arcuate sleeve member; a plurality of bolts (72) extending from the first connecting flange of the first arcuate sleeve member to the first connecting flange of the second arcuate sleeve member; and a plurality of bolts (72A) extending from the second connecting flange of the first arcuate sleeve member to the second connecting flange of the second arcuate sleeve member. The conduit coupling assembly may comprise a first longitudinally extending gasket (70) disposed in a circumferential gap (76) between the first longitudinally extending edge of the first arcuate sleeve member and the first longitudinally extending edge of the second arcuate sleeve member. The conduit coupling assembly may comprise a second longitudinally extending gasket (70A) disposed in a circumferential gap (76A) between the second longitudinally extending edge of the first arcuate sleeve member and the second longitudinally extending edge of the second arcuate sleeve member.

The arcuate gasket may comprise a radial-split arcuate outer gasket layer (40, 40A) and a separate radial-split arcuate inner gasket layer (30, 30A), the inner and outer gasket layers configured to be selectively disengaged from each other. The outer circumferential surface of the inner gasket layer may comprise a plurality of radially protruding circumferentially spaced spokes (61A, 61B, 61C) interfacing with the outer gasket layer to maintain the angular alignment of the inner and outer gasket layers about the longitudinal axis. The inner circumferential surface of the outer gasket layer may comprise a plurality of circumferentially spaced cavities (62A, 62B, 62C) configured to receive the protruding circumferentially spaced spokes of the inner gasket layer to maintain the angular alignment of the outer gasket layer and the inner gasket layer about the longitudinal axis. The inner circumferential surface of the outer gasket layer may comprise a plurality of inwardly extending circumferential channels (57A, 57B) therein; the outer circumferential surface of the inner gasket layer may comprise a plurality of outwardly extending circumferential splines (39A, 39B); and the circumferential channels of the outer gasket layer may be configured to receive the circumferential splines of the inner gasket layer.

In another aspect, a conduit coupling assembly (15) configured to clamp to a fluid conduit (19, 119) oriented about a longitudinal axis (x-x) is provided comprising: a first arcuate sleeve member (16A); a second arcuate sleeve member (16B); a connecting assembly (18) coupling the first sleeve member to the second sleeve member and configured to tighten the first and second sleeve members to the fluid conduit from a non-actuated position (FIG. 9, FIG. 12) to a tightened position (FIG. 11, FIG. 13); an arcuate gasket (25, 25A) having a radial-split (27) and configured to be positioned between the first and second sleeve members and the fluid conduit; the gasket having an outer arcuate surface (26); the first arcuate sleeve member having a first longitudinally extending edge (28), a second longitudinally extending edge (28A), and a first inwardly-facing arcuate pocket (45) curving about the longitudinal axis from the first longitudinally extending edge to the second longitudinally extending edge when the first and second sleeve members are in the tightened position, the first inwardly-facing arcuate pocket configured to receive a portion of the radial-split gasket; the first arcuate pocket having an inwardly-facing arcuate surface (48) when the first and second sleeve members are in the tightened position; said inwardly-facing arcuate surface (48) of said first arcuate pocket (45) have a non-uniform radius (31B, 31A, 36A, 30A, 36B, 31C, 31D) from said longitudinal axis (x-x) between said first longitudinally extending edge (28) and said second longitudinally extending edge (28A) of said first arcuate sleeve member (16A); said second arcuate sleeve member (16B) having a first longitudinally extending edge (29), a second longitudinally extending edge (29A), and a second inwardly-facing arcuate pocket (50) curving about said longitudinal axis (x-x) from said first longitudinally extending edge (29) to said second longitudinally extending edge (29A) when said first and second sleeve members are in said tightened position, said second inwardly-facing arcuate pocket configured to receive a portion of said radial-split gasket; said second arcuate pocket (50) having an inwardly-facing arcuate surface (53) when said first and second sleeve members are in said tightened position; said inwardly-facing arcuate surface (53) of said second arcuate pocket (50) have a non-uniform radius (32B, 32A, 36C, 30B, 36D, 32C, 32D) from said longitudinal axis (x-x) between said first longitudinally extending edge (29) and said second longitudinally extending edge (29A) of said second arcuate sleeve member (16B).

The non-uniform radius of said inwardly-facing arcuate surface (48) of said first arcuate pocket (45) may range from a minimum radius (30A) to a maximum radius (31A, 31C) and said non-uniform radius of said inwardly-facing arcuate surface (53) of said second arcuate pocket (50) may range from a minimum radius (30B) to a maximum radius (32A, 32C). The maximum radius (31A) of said inwardly-facing arcuate surface (48) said first arcuate pocket (45) may be at a circumferential position about said longitudinal axis (x-x) that is between said first longitudinally extending edge (28) of said first arcuate sleeve member (16A) and a circumferential position about said longitudinal axis (x-x) of said minimum radius (30A) of said inwardly-facing arcuate surface (48) said first arcuate pocket (45). The maximum radius (32A) of said inwardly-facing arcuate surface (53) of said second arcuate pocket (50) may be at a circumferential position about said longitudinal axis (x-x) that is between said first longitudinally extending edge (29) of said second arcuate sleeve member (16B) and a circumferential position about said longitudinal axis (x-x) of said minimum radius (30B) of said inwardly-facing arcuate surface (53) said second arcuate pocket (50).

DETAILED DESCRIPTION OF THE EMBODIMENTS

Figure 1:
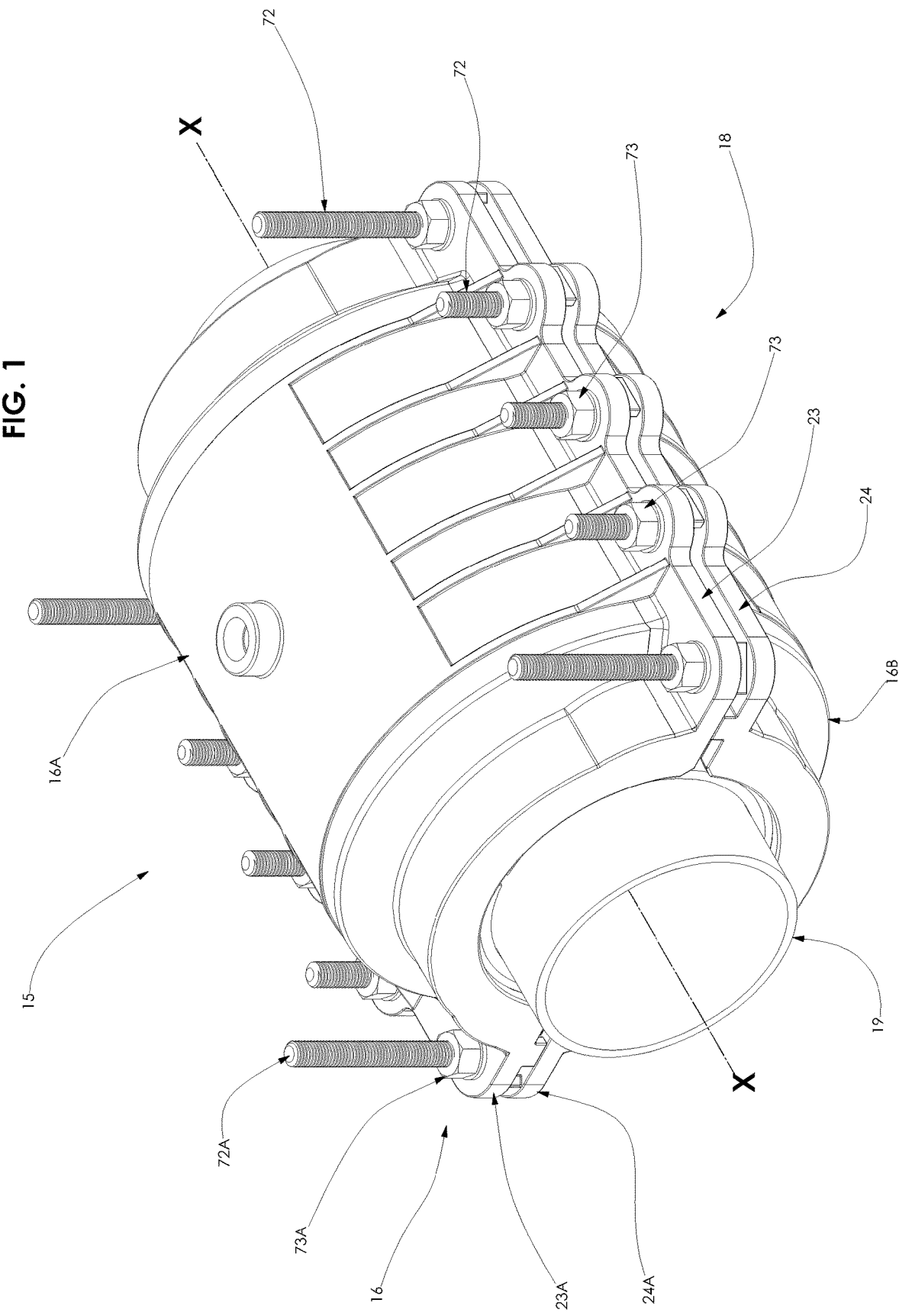
FIG. 1 is a perspective view of an embodiment of the improved assembly on a conduit.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
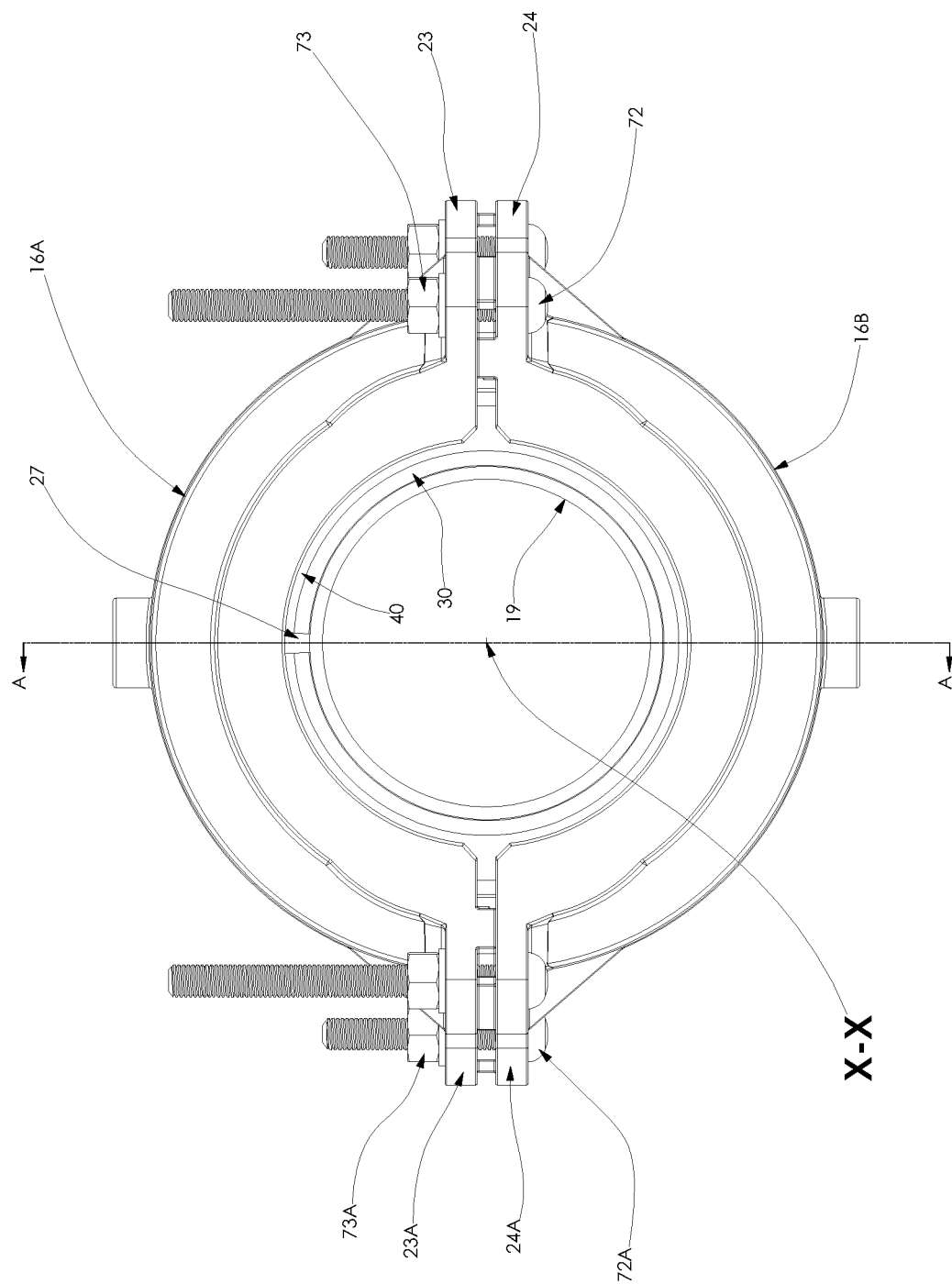
FIG. 2 is an end view of the assembly shown in FIG. 1.
Figure 3:
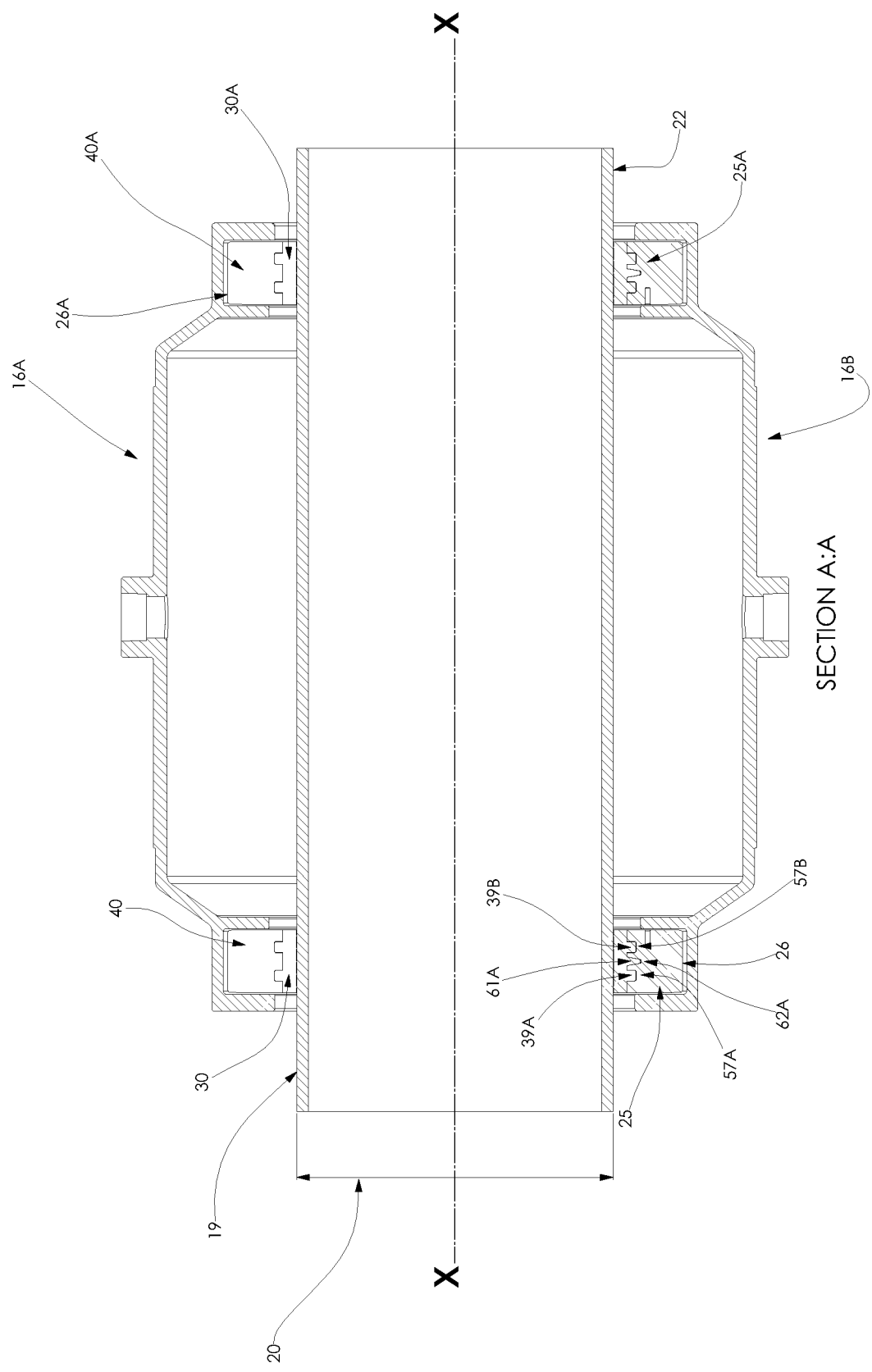
FIG. 3 is a longitudinal vertical cross-sectional view of the assembly shown in FIG. 2, taken generally on line A-A of FIG. 2.

Referring now to the drawings, and more particularly to FIGS. 1-3 thereof, an improved pipe coupling assembly is provided, of which a first embodiment is generally indicated at 15. As shown, assembly 15 generally comprises outer encapsulation sleeve or shell 16 and two end gaskets 25 and 25A, which surround pipe 19 having outer pipe diameter 20. Shell 16, gaskets 25 and 25A and pipe 19 are all generally ring-like cylindrical structures orientated about axis x-x. In operation, sleeve 16 is circumferentially disposed on the outside of pipe 19.

Figure 4:
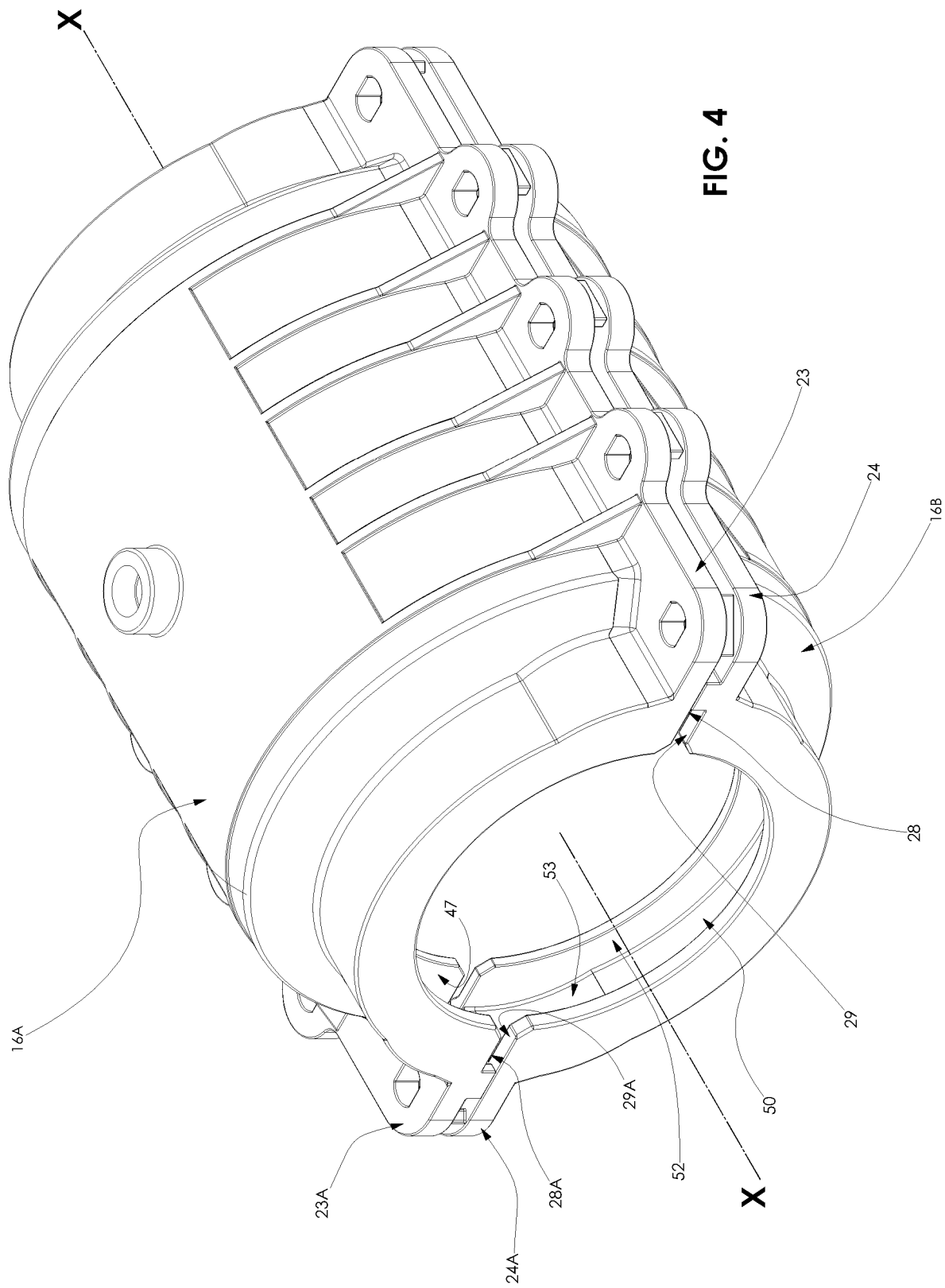
FIG. 4 is a perspective view of the shell shown in FIG. 1.
Figure 5:
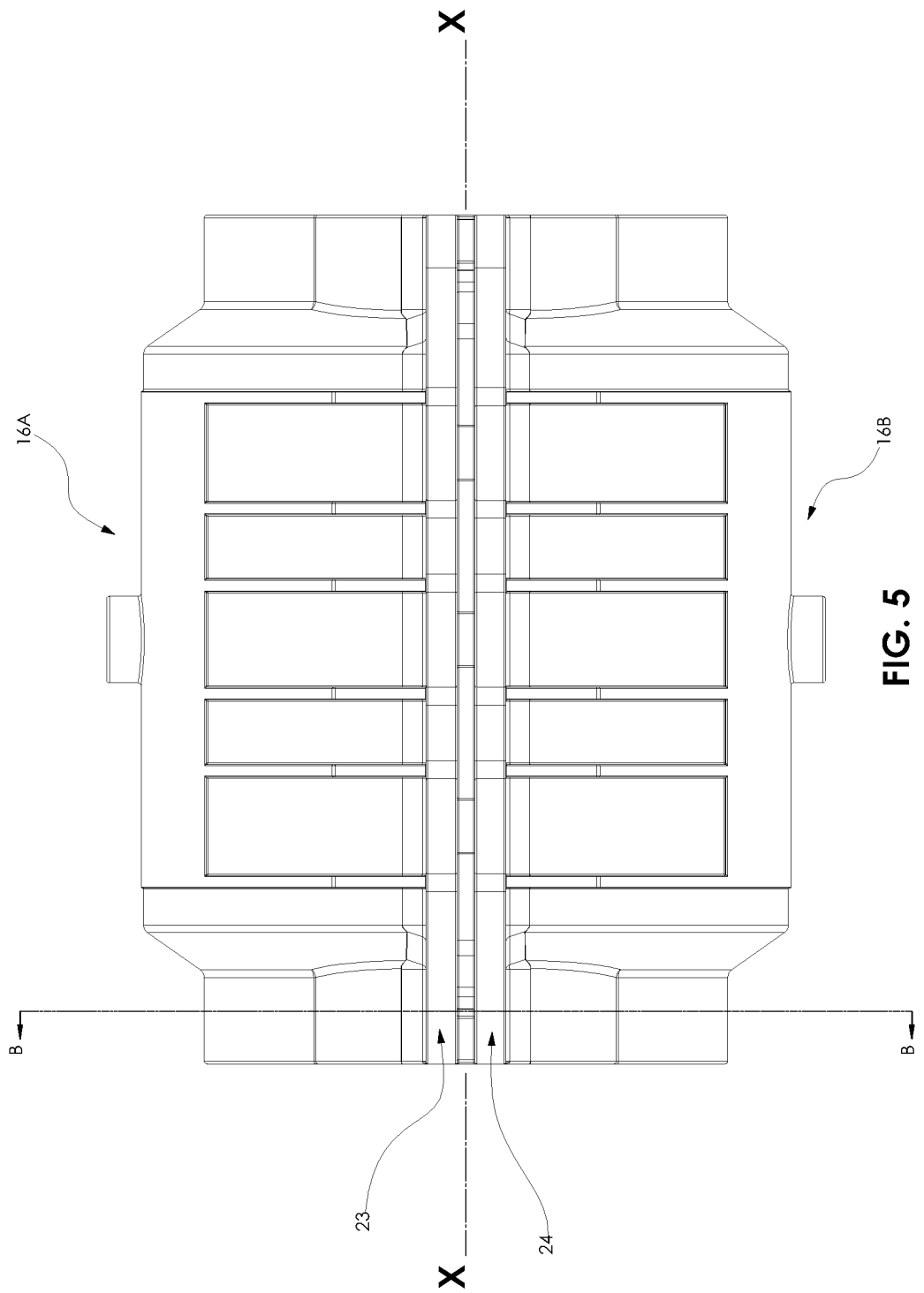
FIG. 5 is a right side elevational view of the shell shown in FIG. 4.

Sleeve 16 includes semi-cylindrical top half shell 16A and semi-cylindrical lower half shell 16B, which are bolted together via tightening assembly 18 to encapsulate pipe 19. Sleeve 16 has two pairs of radially and longitudinally extending opposed flanges 23, 24 and 23A, 24A that are drawn towards each other to seal pipe 19. With reference to FIG. 4, top shell 16A includes right flange 23 extending radially from longitudinally extending edge 28 of top shell 16A and left flange 23A extending radially from longitudinally extending edge 28A of top shell 16A. Bottom shell 16B includes right flange 24 extending radially from longitudinally extending edge 29 of bottom shell 16B and left flange 24A extending radially from longitudinally extending edge 29A of bottom shell 16B. Top half shell 16A and bottom half shell 16B are thereby connected and tightened around pipe 19 via bolts 72 and 72A extending between opposed flanges 23, 24 and 23A, 24A, respectively, and corresponding nuts 73 and 73A.

End gaskets 25 and 25A are configured to wrap around and encircle pipe 19 between outer surface 22 of pipe 19 and specially configured inner pockets 45 and 50, and 45A and 50A of the two halves 16A and 16B, respectively, of encapsulating sleeve 16 to form a seal, with end gaskets 25A and 25B sealing on pipe 19 having outer diameter 20. Sleeve 16 is thereby configured and arranged to be tightened around pipe 19 as the two pairs of longitudinally extending edges 23, 24 and 23A, 24A of sleeve 16 are drawn towards each other via tightening assembly 18 to seal pipe 16.

Figure 3A:
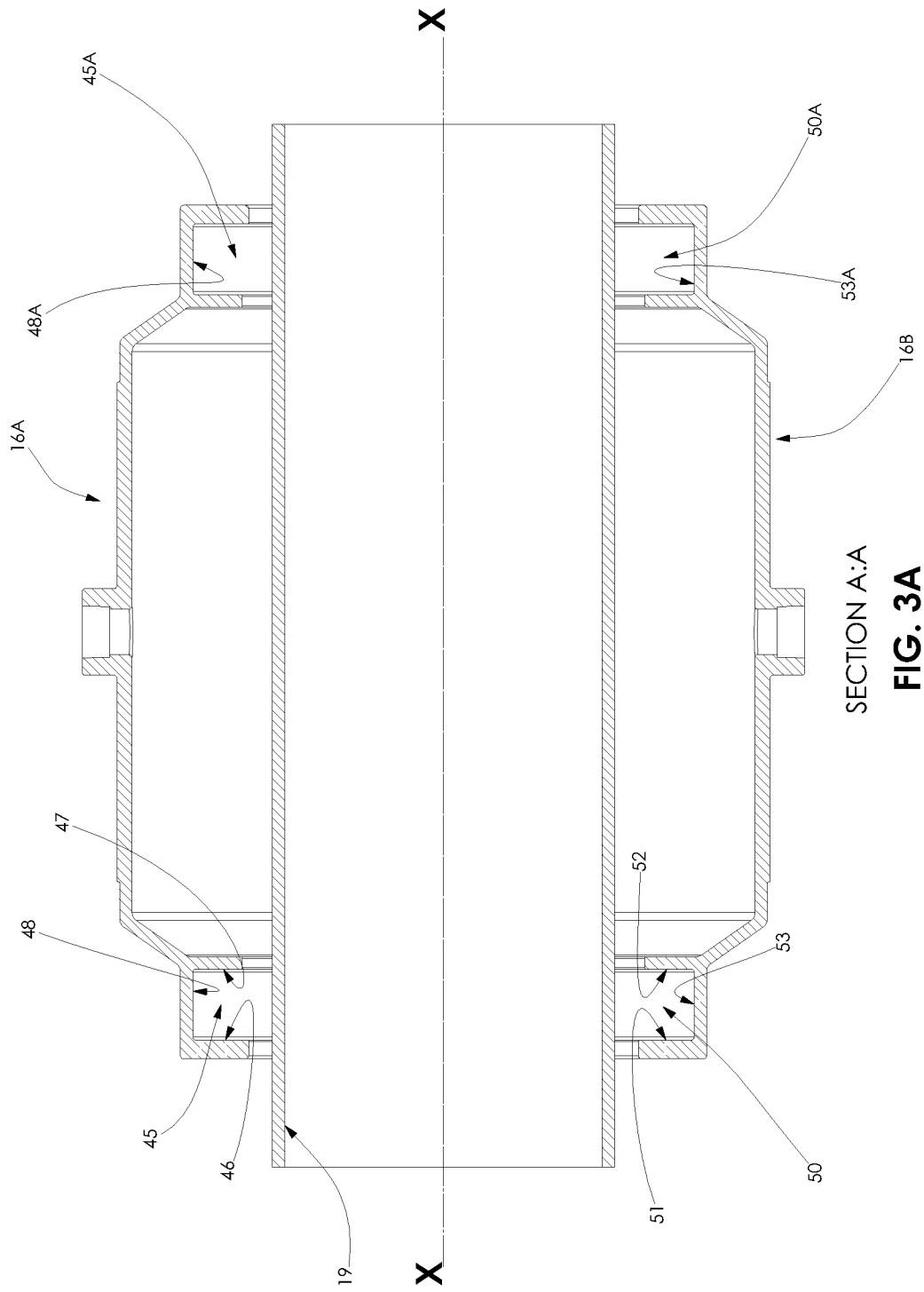
FIG. 3A is a cross-sectional view of the shell and pipe shown in FIG. 3.

Each of pockets 45, 45A, 50 and 50A of the two halves 16A and 16B of sleeve 16 are semi-cylindrical inwardly-facing open-faced channels orientated in a plane substantially perpendicular to axis x-x that curve about longitudinal axis x-x from first longitudinally extending edge 23 to second longitudinally extending edge 23A, in the case of pockets 45 and 45A, and from first longitudinally extending edge 24 to second longitudinally extending edge 24A, in the case of pockets 50 and 50A. As shown in FIG. 3A, pocket 45 in top shell 16A is defined by leftwardly-facing vertical semi-annular surface 47, inwardly facing horizontal arcuate surface 48, and rightwardly-facing vertical semi-annular surface 46. Pocket 45A in top shell 16A is configured in the same manner as pocket 45. Pocket 50 in bottom shell 16B is defined by leftwardly-facing vertical semi-annular surface 52, inwardly facing horizontal arcuate surface 53, and rightwardly-facing vertical semi-annular surface 51. Pocket 50A in top shell 16B is configured in the same manner as pocket 50. Pockets 45 and 50 are configured to axially-retain outer gasket 40 and radially compress end gasket 25 against pipe 19. Pockets 45A and 50A are configured to axially-retain outer gasket 40A and radially compress end gasket 25A against pipe 19 in the same manner as pockets 45 and 50.

As shown in FIGS. 6, 6A, 9, 11, 12 and 13, arcuate surface 48 of pocket 45 is formed of multiple arcuate portions having different curvatures and arcuate surface 53 of pocket 50 is formed of multiple arcuate portions having correspondingly different curvatures such that right and left increased radial gaps 36 and 37 are provided between outwardly-facing cylindrical surface 26 of gasket 40 and inwardly-facing arcuate surfaces 48 and 53 of sleeve 16 adjacent longitudinally extending edges 28, 29 and 28A, 29A to allow for gasket 40 to expand into as assembly 15 is tightened and gasket 40 compresses around pipe 19. This allows for assembly 15 to be used on different diameter pipes without gasket material being extruded radially between opposed longitudinally extending edges 23, 24 and 23A, 24A of half shells 16A and 16B, respectively.

Figure 6:
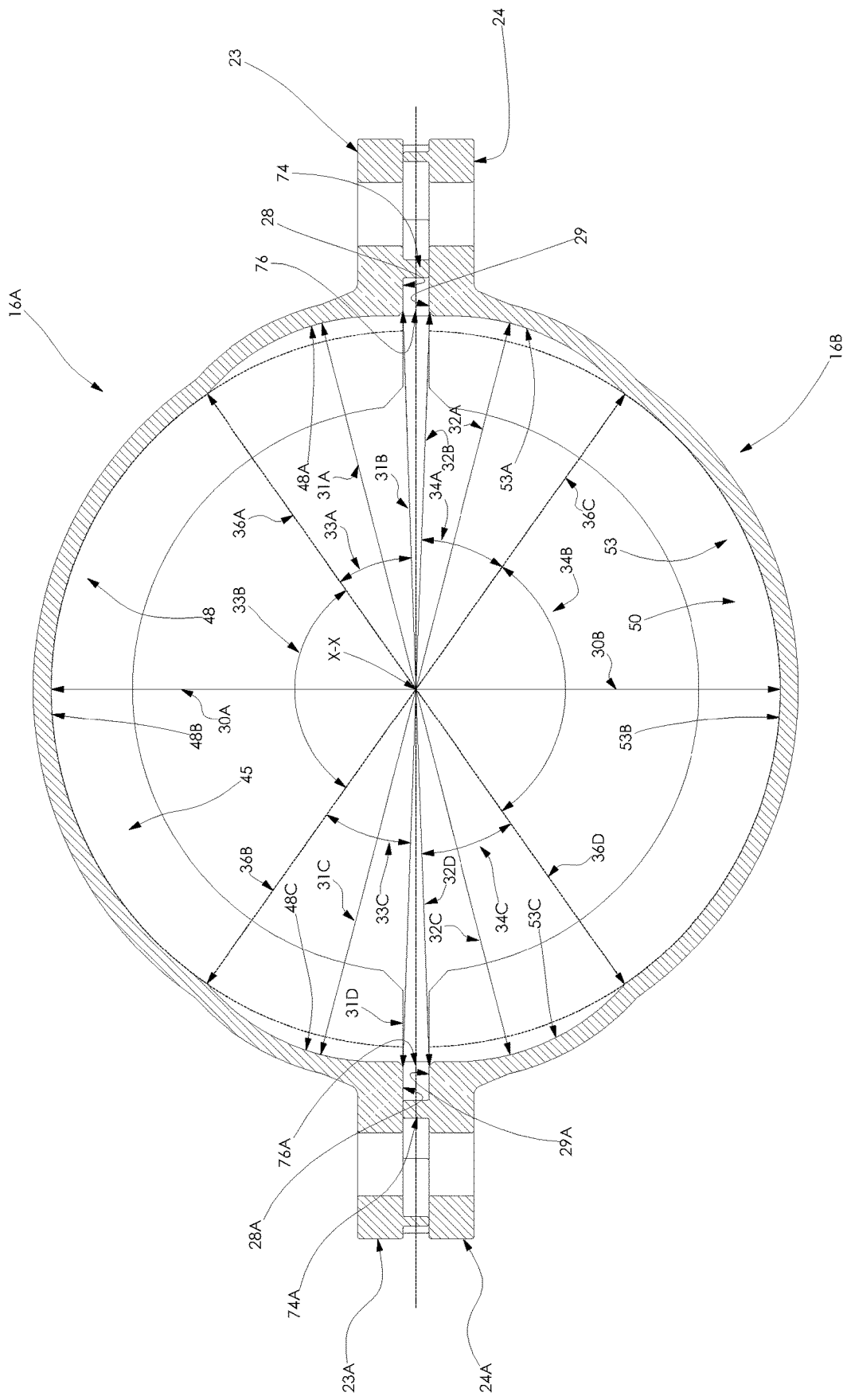
FIG. 6 is a transverse vertical cross-sectional view of the shell shown in FIG. 5, taken generally on line B-B of FIG. 5.

In this embodiment, inwardly-facing arcuate surface 48 of first arcuate pocket 45 comprises middle arc portion 48B and outer arc portions 48A and 48C curving from the respective longitudinal edges of middle arc portion 48B to longitudinal edges 28 and 28A of shell 16A. As shown in FIG. 6, in this embodiment, middle arc portion 48B is a non-circular arc portion having central arc angle 33B about axis x-x and a radius from axis x-x that ranges from minimum radius 30A, at a radial position an equal circumferential distance from longitudinal edges 28 and 28A, to maximum radius 36A and 36B where the respective longitudinal edges of middle arc portion 48B join the longitudinal edges of arc portions 48A and 48C, respectively. In this embodiment, arc angle 33B is between about 5 and about 170 degrees and the difference between minimum radius 30A and maximum radius 36A and 36B is between about 0 and about 2 inches. Thus, moving clockwise from minimum radius 30A of surface 48B, the radius from axis x-x of arc portion 48B increases from radius 30A to radius 36A, and moving counter-clockwise from minimum radius 30A of surface 48B, the radius from axis x-x of arc portion 48B increases from radius 30A to radius 36B. Accordingly, middle arc portion 48B is a non-circular arc portion about longitudinal axis x-x having arc angle 33B and a radius from longitudinal axis x-x that may vary through arc angle 33B.

With reference to FIG. 6, moving clockwise from middle arc portion 48B, the radius of arc portion 48A from axis x-x increases from radius 36A to maximum radius 31A and then decreases slightly to radius 31B at longitudinal edge 28, which is still greater than radius 36A. Thus, right arc portion 48A is a non-circular arc portion about longitudinal axis x-x having arc angle 33A and a radius from longitudinal axis x-x that may vary through arc angle 33A but remains always greater than minimum radius 30A of middle arc portion 48B and is equal or greater than maximum arc radius 36A of middle arc portion 48B. In this embodiment, arc angle 33A is between about 0 and about 80 degrees and the difference between radius 36A and maximum radius 31A is between about 0 and about 2 inches.

With reference to FIG. 6, moving counter-clockwise from middle arc portion 48B, the radius of arc portion 48C from axis x-x increases from radius 36B to maximum radius 31C and then decreases slightly to radius 31D at longitudinal edge 28A, which is still greater than radius 36B. Thus, left arc portion 48C is a non-circular arc portion about longitudinal axis x-x having arc angle 33C and a radius from longitudinal axis x-x that may vary through arc angle 33C but remains always greater than minimum radius 30A of middle arc portion 48B and is equal or greater than maximum arc radius 36B of middle arc portion 48B. In this embodiment, arc angle 33C is between about 0 and about 80 degrees and the difference between radius 36B and maximum radius 31C is between about 0 and about 2 inches.

In this embodiment, inwardly-facing arcuate surface 53 of arcuate pocket 50 comprises middle arc portion 53B and outer arc portions 53A and 53C curving from the respective longitudinal edges of middle arc portion 53B to longitudinal edges 29 and 29A of shell 16B. As shown in FIG. 6, in this embodiment, middle arc portion 53B is a non-circular arc portion having central arc angle 34B about axis x-x and a radius from axis x-x that ranges from minimum radius 30B, at a radial position an equal circumferential distance from longitudinal edges 29 and 29A, to maximum radius 36C and 36D where the respective longitudinal edges of middle arc portion 53B join the longitudinal edges of arc portions 53A and 53C, respectively. In this embodiment, arc angle 34B is between about 5 and about 170 degrees and the difference between minimum radius 30B and maximum radius 36C and 36D is between about 0 and about 2 inches. Thus, moving clockwise from minimum radius 30B of surface 53B, the radius from axis x-x of arc portion 53B increases from radius 30B to radius 36D, and moving counter-clockwise from minimum radius 30B of surface 53B, the radius from axis x-x of arc portion 53B increases from radius 30B to radius 36C. Accordingly, middle arc portion 53B is a non-circular arc portion about longitudinal axis x-x having arc angle 34B and a radius from longitudinal axis x-x that may vary through arc angle 34B With reference to FIG. 6, moving counter-clockwise from middle arc portion 53B, the radius of arc portion 53A from axis x-x increases from radius 36C to maximum radius 32A and then decreases slightly to radius 32B at longitudinal edge 29, which is still greater than radius 36C. Thus, right arc portion 53A is a non-circular arc portion about longitudinal axis x-x having arc angle 34A and a radius from longitudinal axis x-x that may vary through arc angle 34A but remains always greater than minimum radius 30B of middle arc portion 53B and is equal or greater than maximum arc radius 36C of middle arc portion 53B. In this embodiment, arc angle 34A is between about 0 and about 80 degrees and the difference between radius 36C and maximum radius 32A is between about 0 and about 2 inches.

With reference to FIG. 6, moving clockwise from middle arc portion 53B, the radius of arc portion 53C from axis x-x increases from radius 36D to maximum radius 32C and then decreases slightly to radius 32D at longitudinal edge 29A, which is still greater than radius 36D. Thus, left arc portion 53C is a non-circular arc portion about longitudinal axis x-x having arc angle 34C and a radius from longitudinal axis x-x that may vary through arc angle 34C but remains always greater than minimum radius 30B of middle arc portion 53B and is equal or greater than maximum arc radius 36D of middle arc portion 53B. In this embodiment, arc angle 34C is between about 0 and about 80 degrees and the difference between radius 36D and maximum radius 32C is between about 0 and about 2 inches.

Figure 6A:
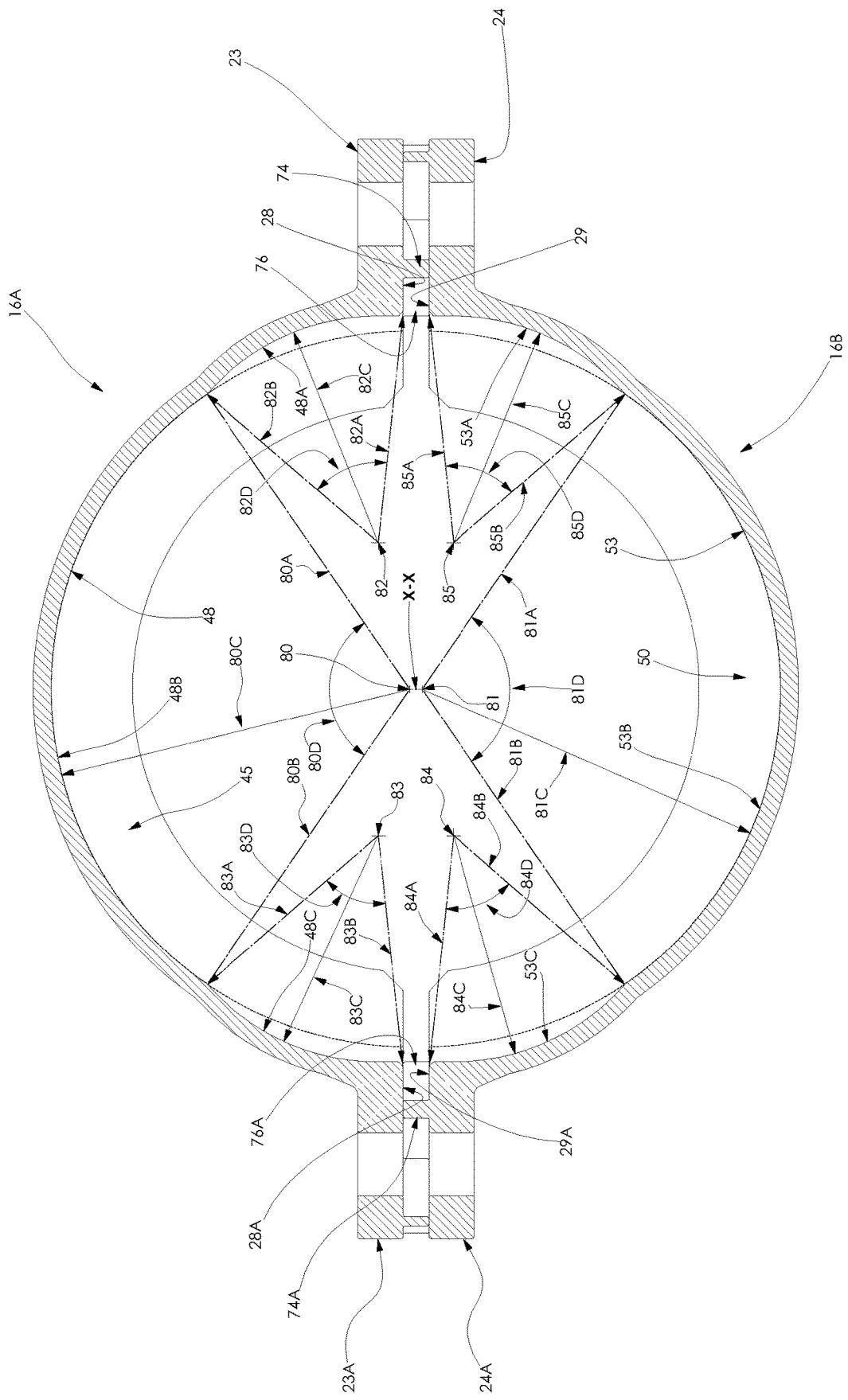
FIG. 6A is the cross-sectional view of the shell shown in FIG. 6.
Figure 7:
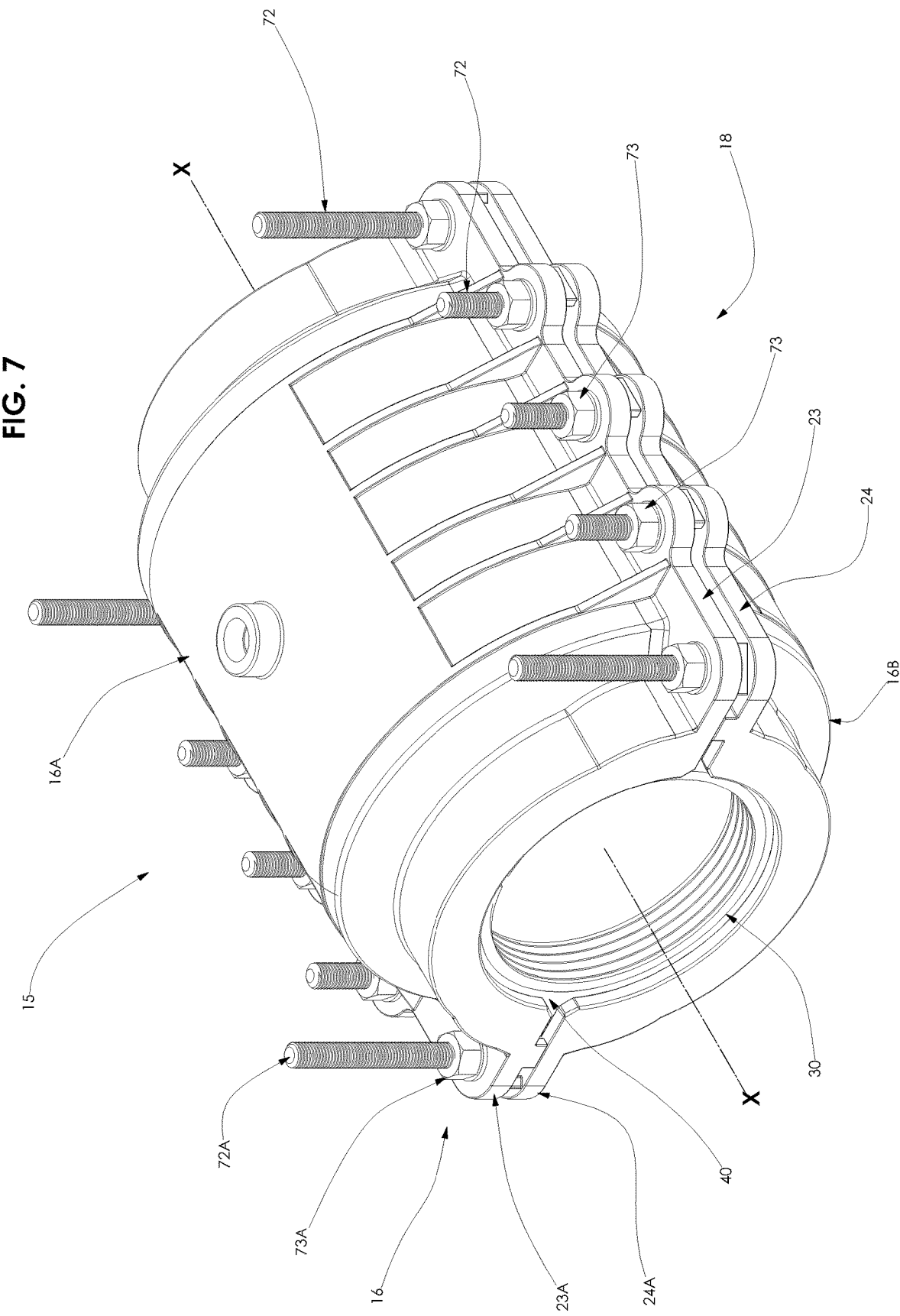
FIG. 7 is a perspective view of the shell and gaskets shown in FIG. 1.
Figure 8:
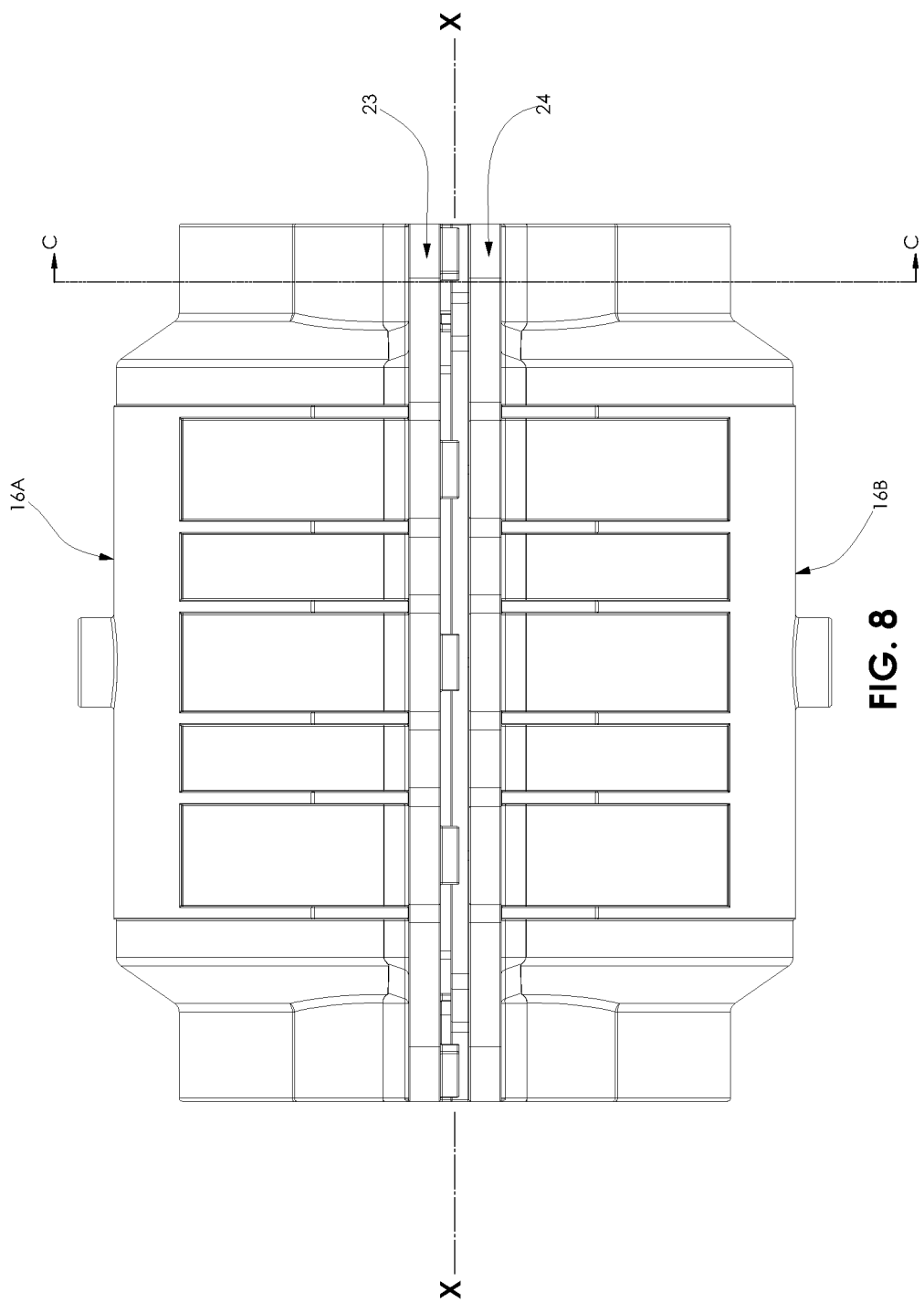
FIG. 8 is a right side elevational view of the shell and gaskets shown in FIG. 7.

As shown in FIG. 6A, in this embodiment surface portions 48A, 48B and 48C are circular arc portions generated about central axes 82, 80 and 83, respectively. Each of axis 82, 80 and 83 about which such circular arc portions are defined, are offset from longitudinal axis x-x to thereby provide a non-uniform radius to inwardly-facing arcuate surface 48 of pocket 45 about longitudinal axis x-x between longitudinal edges 28 and 28A of shell 16A.

As shown in FIG. 6A, middle arc portion 48B is generally defined by a circular arc having arc angle 80D about its central axis 80 and a constant radius 80C about axis 80, such that radius 80A and radius 80B, where the respective longitudinal edges of middle arc portion 48B join the longitudinal edges of arc portions 48A and 48C, respectively, are the same, and the same as middle arc radius 80C. As shown, axis 80 is radially offset inwardly from longitudinal axis x-x. In this embodiment, arc angle 80D is between about 5 and about 170 degrees and is greater than arc angle 33B. Accordingly, middle arc portion 48B is defined by a circular arc portion about axis 80 having arc angle 80D and a radius from central axis 80 that is constant through arc angle 80D.

As shown in FIG. 6A, right arc portion 48A is generally defined by a circular arc having arc angle 82D about its central axis 82 and a constant radius 82C about axis 82, such that radius 82A and radius 82B, where the respective longitudinal edges of right arc portion 48B join the longitudinal edge of arc portion 48B and longitudinal edge 28, respectively, are the same, and the same as middle arc radius 82C. As shown, axis 82 is radially offset inwardly from longitudinal axis x-x a distance greater than the offset of axis 80 from longitudinal axis x-x. In this embodiment, arc angle 82D is between about 0 and about 100 degrees and is greater than arc angle 33A. Accordingly, right arc portion 48A is defined by a circular arc portion about axis 82 having arc angle 82D and a radius from central axis 82 that is constant through arc angle 82D.

As shown in FIG. 6A, left arc portion 48C is generally defined by a circular arc having arc angle 83D about its central axis 83 and a constant radius 83C about axis 83, such that radius 83A and radius 83B, where the respective longitudinal edges of right arc portion 48B join the longitudinal edge of arc portion 48B and longitudinal edge 28A, respectively, are the same, and the same as middle arc radius 83C. As shown, axis 83 is radially offset inwardly from longitudinal axis x-x a distance greater than the offset of axis 80 from longitudinal axis x-x and the same distance as the offset of axis 82 from longitudinal axis x-x. In this embodiment, arc angle 83D is between about 0 and about 100 degrees and is greater than arc angle 33C. Accordingly, left arc portion 48C is defined by a circular arc portion about axis 83 having arc angle 83D and a radius from central axis 83 that is constant through arc angle 83D.

As shown in FIG. 6A, in this embodiment surface portions 53A, 53B and 53C are circular arc portions generated about central axes 85, 81 and 84, respectively. Each of axis 85, 81 and 84 about which such circular arc portions are defined, are offset from longitudinal axis x-x to thereby provide a non-uniform radius to inwardly-facing arcuate surface 53 of pocket 50 about longitudinal axis x-x between longitudinal edges 29 and 29A of shell 16B.

As shown in FIG. 6A, middle arc portion 53B is generally defined by a circular arc having arc angle 81D about its central axis 81 and a constant radius 81C about axis 81, such that radius 81A and radius 81B, where the respective longitudinal edges of middle arc portion 53B join the longitudinal edges of arc portions 53A and 53C, respectively, are the same, and the same as middle arc radius 81C. As shown, axis 81 is radially offset inwardly from longitudinal axis x-x the same distance as the radial offset of axis 80 from longitudinal axis x-x. In this embodiment, arc angle 81D is between about 5 and about 170 degrees and is greater than arc angle 34B. Accordingly, middle arc portion 53B is defined by a circular arc portion about axis 81 having arc angle 81D and a radius from central axis 81 that is constant through arc angle 81D. Arc angle 81D is the same as arc angle 80D and radius 81C is the same as radius 80C.

As shown in FIG. 6A, right arc portion 53A is generally defined by a circular arc having arc angle 85D about its central axis 85 and a constant radius 85C about axis 85, such that radius 85A and radius 85B, where the respective longitudinal edges of right arc portion 53B join longitudinal edge 29 and the longitudinal edge of arc portion 53B, respectively, are the same, and the same as middle arc radius 85C. As shown, axis 85 is radially offset inwardly from longitudinal axis x-x a distance greater than the offset of axis 81 from longitudinal axis x-x, and axis 85 is radially offset radially from longitudinal axis x-x the same distance as the radial offset of each of axis 82 and axis 83 from longitudinal axis x-x, respectively. In this embodiment, arc angle 85D is between about 0 and about 100 degrees and is greater than arc angle 34A. Accordingly, right arc portion 53A is defined by a circular arc portion about axis 85 having arc angle 85D and a radius from central axis 85 that is constant through arc angle 85D. Arc angle 85D is the same as arc angle 82D, and radius 85C is the same as radius 82C.

As shown in FIG. 6A, left arc portion 53C is generally defined by a circular arc having arc angle 84D about its central axis 84 and a constant radius 84C about axis 84, such that radius 84A and radius 84B, where the respective longitudinal edges of right arc portion 53B join the longitudinal edge of arc portion 53B and longitudinal edge 28A, respectively, are the same, and the same as middle arc radius 84C. As shown, axis 84 is radially offset inwardly from longitudinal axis x-x a distance greater than the offset of axis 81 from longitudinal axis x-x, and the same distance as the offset of axis 85 from longitudinal axis x-x, and axis 84 is offset radially from longitudinal axis x-x the same distance as the radial offset of each of axis 82 and axis 83 from longitudinal axis x-x, respectively. In this embodiment, arc angle 84D is between about 0 and about 100 degrees and is greater than arc angle 33C. Accordingly, left arc portion 53C is defined by a circular arc portion about axis 84 having arc angle 84D and a radius from central axis 84 that is constant through arc angle 84D. Arc angle 84D is the same as arc angle 82D, and radius 84C is the same as radius 82C.

Figure 9:
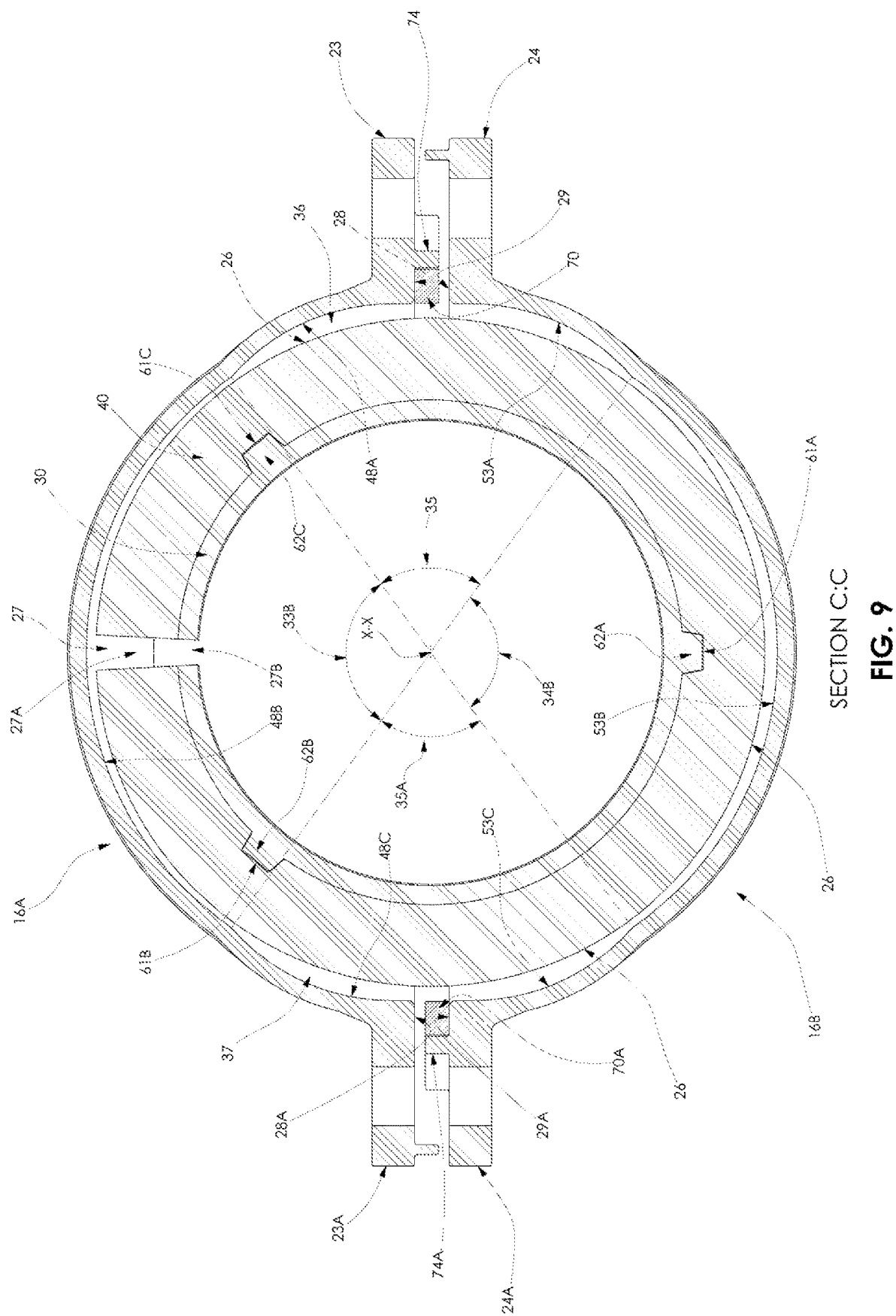
FIG. 9 is a transverse vertical cross-sectional view of the shell and gaskets shown in FIG. 8, taken generally on line C-C of FIG. 8.
Figure 10:
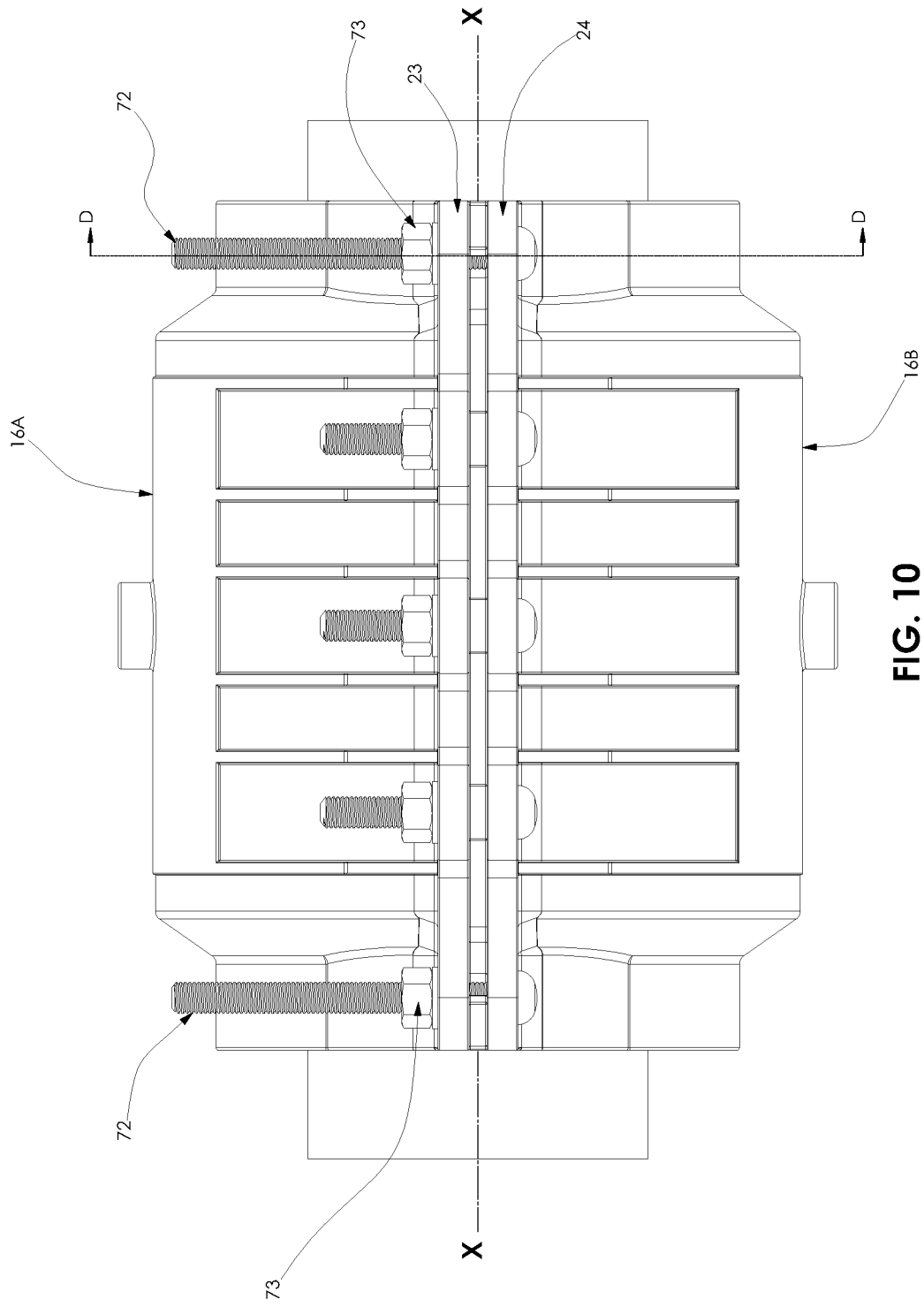
FIG. 10 is a right side elevational view of the assembly shown in FIG. 1 in a tightened position.

When sleeve 16 is closed about end gasket 25, as shown in FIG. 9, the radially expanded surfaces 48A, 48C, 53A and 53C of shell pockets 45 and 50 of shell 16 provide a first radial gap 36 (having gap angle 35 about longitudinal axis x-x) from outer surface 26 of gasket 40 on the right side adjacent the right circumferential junction between top and lower shells 16A and 16B and a second radial gap 37 from outer surface 26 of gasket 40 on the left side (having gap angle 35A about longitudinal axis x-x) adjacent the left circumferential junction between upper and lower shells 16A and 16B. When sleeve 16 is tightened to pipe 16 by tightening nuts 73 and 73A on bolts 72 and 72A extending through opposed flanges 23, 24 and 23A, 24B, as shown in FIG. 11, excess gasket materials is contained in radial gaps 36 and 37 rather than interfering with the sealing action of assembly 15.

While in this embodiment inwardly facing surfaces 48 and 53 of pockets 45 and 50 of shells 16A and 16B, respectively, are provided will inner gasket facing surfaces having a non-uniform radius about axis x-x by being formed of different radiused surfaces as described above, such variability could be provided by using other alternative arcuate shell pocket configurations with differently contoured inner surfaces to provide a radial gap between the outer surface of the gasket on the right side adjacent the right circumferential junction between top and lower shells 16A and 16B and a radial gap between the outer surface of the gasket on the left side adjacent the left circumferential junction between upper and lower shells 16A and 16B.

Figure 11:
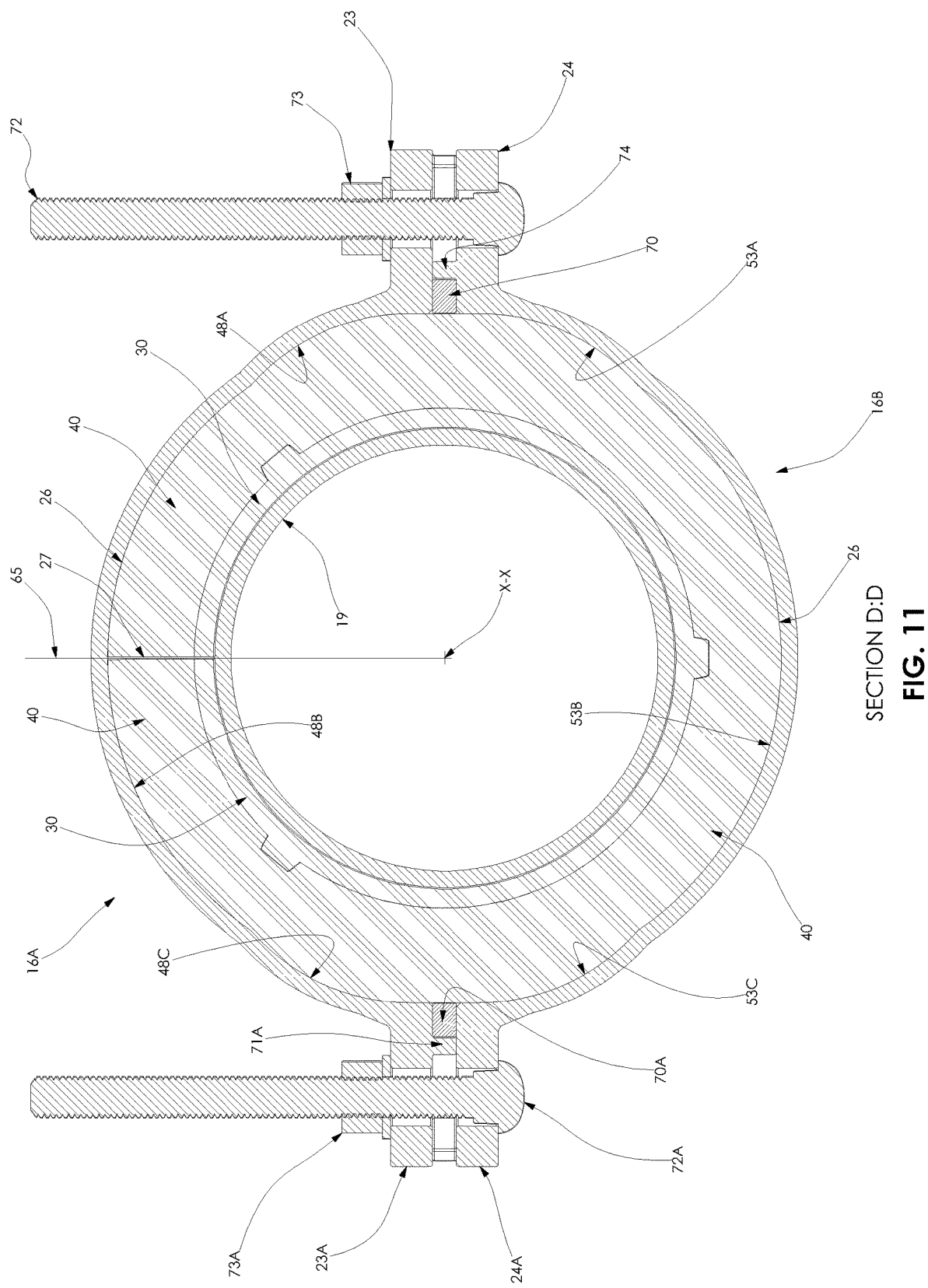
FIG. 11 is a transverse vertical cross-sectional view of the assembly shown in FIG. 10, taken generally on line D-D of FIG. 10.

As shown in FIGS. 9, 11, 12 and 13, top half shell 16A includes longitudinally extending stop 74 configured to bear against edge 29 of lower half shell 16B and forming longitudinally extending circumferential space 76 between opposed edges 28 and 29. Lower half shell 16B includes longitudinally extending stop 74A configured to bear against edge 28A of top half shell 16A, forming longitudinally extending circumferential space 76A between opposed edges 28A and 29B. Longitudinal gasket 70 is disposed in space 76 between opposed longitudinal edges 28 and 29 of half shells 16A and 16B, respectively. Longitudinal gasket 70A is disposed in space 76A between opposed longitudinal edges 28A and 29A of half shells 16A and 16B, respectively. Longitudinal gaskets 70 and 70A have a generally rectangular cross-section and run longitudinally parallel to longitudinal axis x-x. These gaskets help seal the circumferential junctions between half shell 16A and half shell 16B when assembly 15 is tightened around pipe 19. When sleeve 16 is tightened to pipe 16 by tightening nuts 73 and 73A on bolts 72 and 72A extending through opposed flanges 23, 24 and 23A, 24B, as shown in FIG. 11, excess gasket material is contained in radial spaces 36 and 37 and does not extrude into spaces 76 and 76A and put undesired pressure on either longitudinal gasket 70 or longitudinal gasket 70A.

End gasket 25 is disposed generally between inner surfaces 48 and 53 of sleeve 16 and outer cylindrical surface 22 of pipe 16. Thus, end gasket 25 is sandwiched between the inside semi-cylindrical surfaces of sleeve 16 and outside cylindrical surface 22 of conduit 19 to provide sufficient sealing force to prevent leakage of fluid. End gasket 25A is disposed generally between inner surfaces 48A and 53A of sleeve 16 and outer cylindrical surface 22 of pipe 16. Thus, end gasket 25A is also sandwiched between the inside semi-cylindrical surfaces of sleeve 16 and outside cylindrical surface 22 of conduit 19 to provide sufficient sealing force to prevent leakage of fluid. Elastic or sealing energy is imparted into assembly 15 by tightening sleeve 16 from a loosened or a non-actuated position to a tightened sealed position.

As shown in FIGS. 3, 9 and 11, each of end gaskets 25 and 25A comprises two nested gasket split-ring layers 30, 40 and 30A and 40A, respectively, that can be separated from each other. Layers 40 and 40A are the same configuration and layers 30 and 30A are the same configuration.

Inner split-ring or layer 30 may be removed from outer split-ring or layer 40. Outer split ring gasket 40 is a specially-configured ring-shaped solid penannular member elongated along axis x-x. Gasket 40 includes annular channel 57A and annular channel 57B extending inwardly from the inner circumference surface of outer gasket 40. Inner split ring gasket 30 is a specially-configured ring-shaped solid penannular member elongated along axis x-x. Inner gasket 30 includes spline 39A and spline 39B extending outwardly from the outer circumferential surface of inner gasket 30. Splines 39A and 39B of inner gasket 30 are orientated in a plane substantially perpendicular to axis x-x and mate with channels 57A and 57B of outer gasket 40, respectively. Inner split-ring 30 does not entirely overlap outer split-ring 40. Inner gasket split-ring 30 is manually removable from outer gasket split-ring 40 to allow end gaskets 25 and 25A to be installed on oversize pipe 119 having outer diameter 120, as shown in FIGS. 12 and 13.

Split-ring end gaskets 25 and 25A are formed of a resilient material and are cut radially so as to be penannular and not form a full ring. Thus, instead of being a full continuous annular ring, radial break or gap 27 is provided through each layer 30 and 40 at a circumferential location. Thus, layer 30 has radial split 27B and layer 40 has radial split 27A through the entire gasket cross-section. The edges of gap 27 may thereby be manually separated or pulled apart from each other to form a more open C-shaped member. This gap is increased such that it is greater than outer diameter 20 of pipe 19 so that end gaskets 25 and 25A can be installed on or fit around outer diameter 20 of pipe 19. Once installed on pipe 19, the opposed ends of the split-rings 30 and 40 will move back towards each other and gap 27 will close up. Inner split-ring 30 and outer split-ring 40 are loosely connected to each other via annular splines 39A and 39B of inner gasket 30 being nested in annular channels 57A and 57B, respectively, such that inner split-ring 30 is adapted to be removed from outer split-ring 40 at a predetermined location. This allows end gasket 25 to be used with pipes of substantially different diameters. Thus, for pipe 19 having smaller outer diameter 20, inner and outer split-rings 30 and 40 are nested and used together, as shown in FIGS. 3, 9 and 11. For pipes 119 of greater outer diameter 120, inner split-ring 30 is manually separated from outer split-ring 40 and just outer split-ring 40 is used as the end gasket, as shown in FIGS. 12 and 13.

As shown in FIGS. 3, 9 and 11, inner gasket layer 30 includes three circumferentially spaced radially extending protrusions 61A, 61B and 61C interfacing with correspondingly circumferentially spaced radially inwardly extending cavities 62A, 62B and 62C in outer gasket layer 40. Protrusions 61A, 61B and 61C of gasket layer 30 mate with cavities 62A, 62B and 62C in outer gasket layer 40 to retain gasket layers 30 and 40 in rotational and angular alignment about longitudinal axis x-x. When nested, protrusions 61A, 61B and 61C of gasket layer 30, mated with cavities 62A, 62B and 62C of gasket layer 40, prevent rotational movement of gasket layers 30 and 40 relative to each other about axis x-x such that radial splits 27A and 27B are aligned on common radius 65 about axis x-x.

Figure 12:
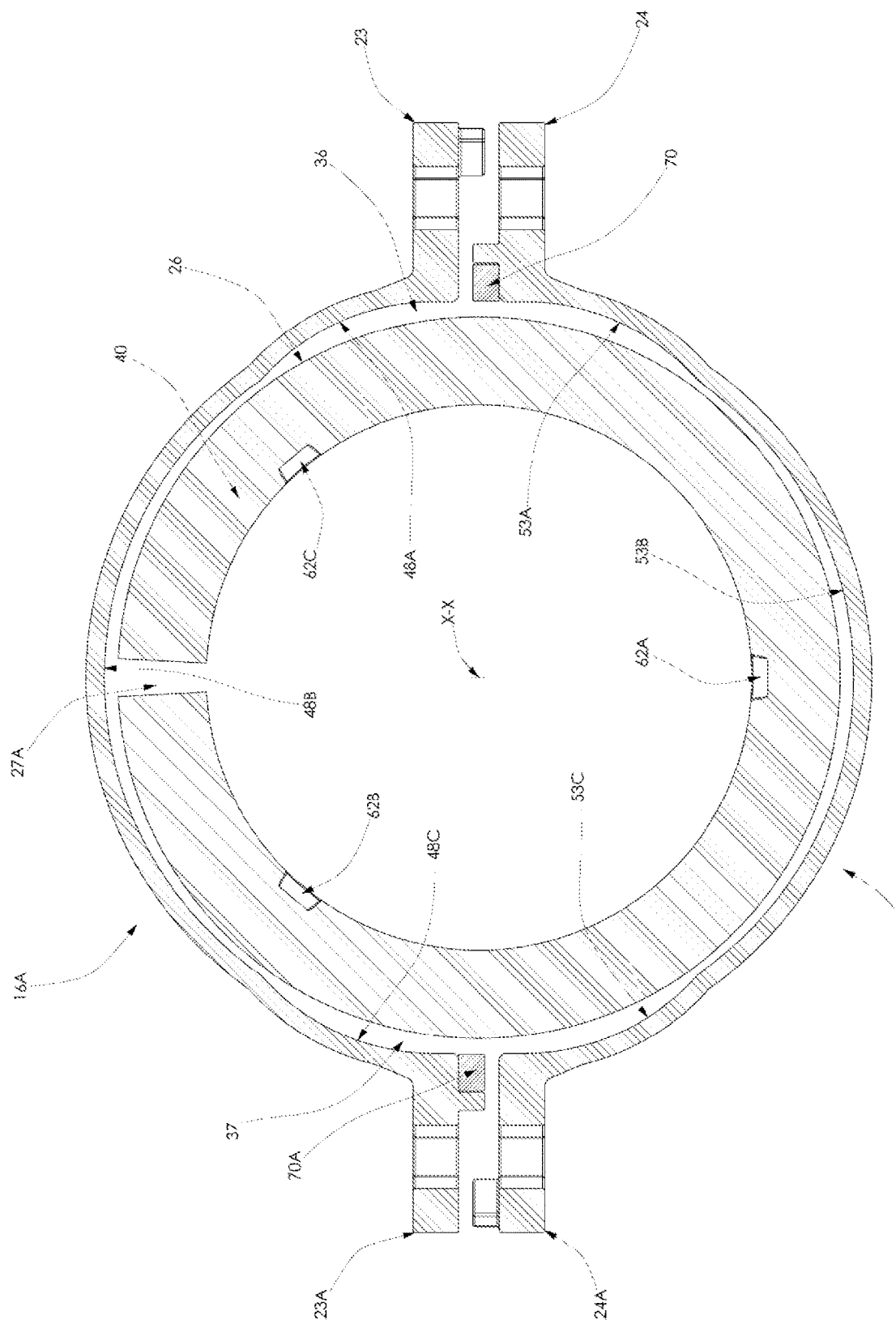
FIG. 12 is a transverse vertical cross-sectional view of the shell and gaskets shown in FIG. 8, taken generally on line C-C of FIG. 8, modified for installation on an oversized diameter pipe.
Figure 13:
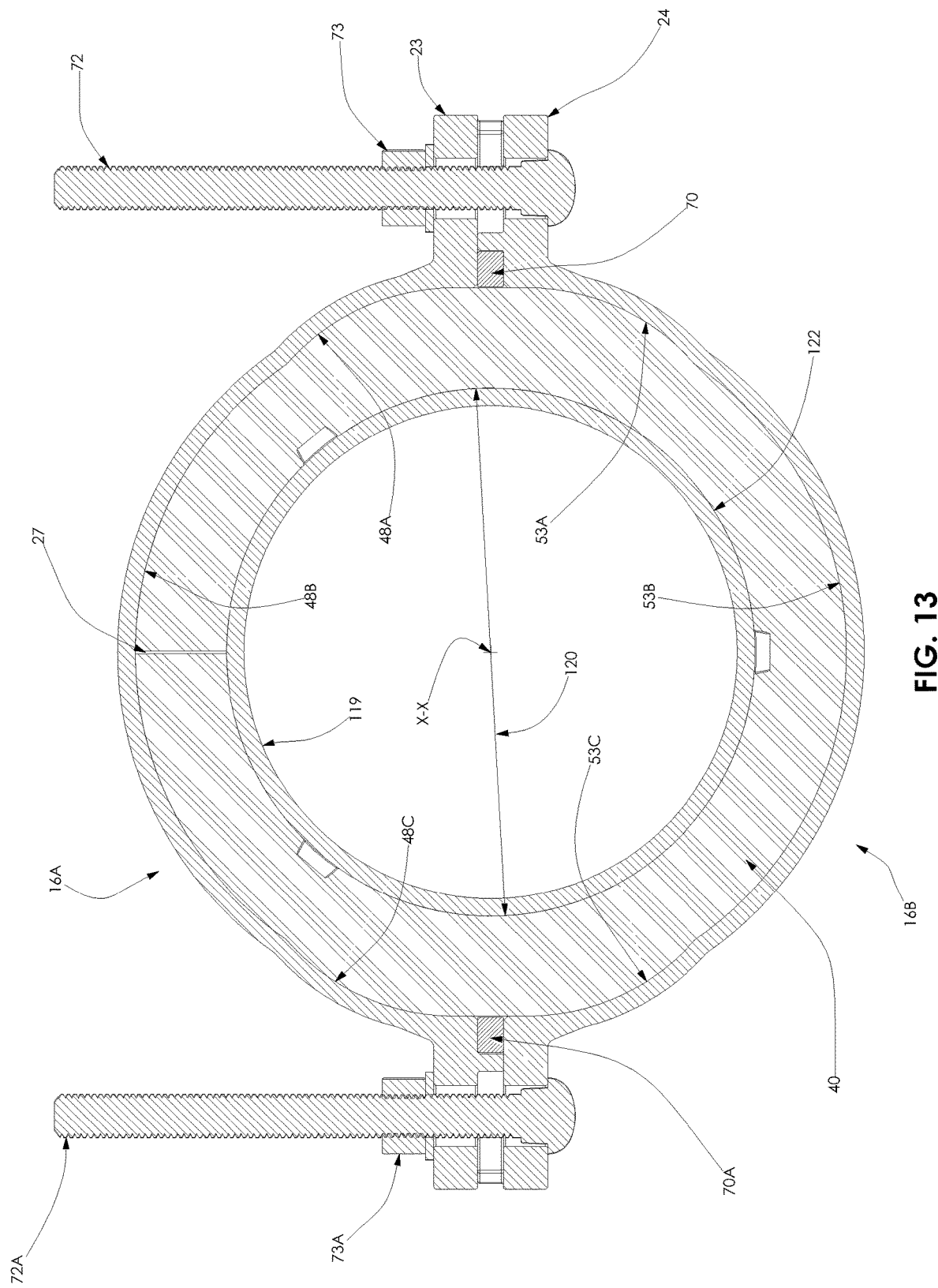
FIG. 13 is a transverse vertical cross-sectional view of the assembly shown in FIG. 10, taken generally on line D-D of FIG. 10, installed on an oversized diameter pipe.

Outer gasket layer 40 is configured to nest in annular pockets 45 and 50 of shell 16 along outer circumferential surface 26 of gasket layer 40 and has an inner circumferential surface configured to engage either inner gasket layer 30, as shown in FIGS. 3, 9 and 11, or outer surface 122 of pipe 119 when inner gasket layer 30 is removed, as shown in FIGS. 12 and 13. Outer gasket layer 40A is configured to nest in annular pockets 45A and 50A of shell 16 along outer circumferential surface 26A of gasket layer 40A and has an inner circumferential surface configured to engage either inner gasket layer 30, as shown in FIGS. 3, 9 and 11, or outer surface 122 of pipe 119 when inner gasket layer 30 is removed, as shown in FIGS. 12 and 13.

Inner gasket layer 30 may be selectively disengaged from outer gasket layer 40 and removed from coupling assembly 15 to modify an effective range of pipe outer diameters that may be sealed by and accommodated within coupling assembly 15. Thus, removable inner gasket layer 30 enables modification of an effective diameter of coupling assembly 15. For example, and without limitation, diameter 20 may allow coupling assembly 15 to receive a pipe or pipe end having an outer diameter (OD) in the range of about 6.55 inches to about 7.05 inches due to the presence of the inner gasket layer 30. However, removal of inner gasket layer 30 results in a second opening of diameter 120, which may allow, for example and without limitation, assembly 15 to thereby receive a pipe or pipe end having an OD in the range of about 7.04 inches to about 7.65 inches. However, the diametrical dimensions and ranges of gaskets 25 and 25A may be modified in other embodiments for pipes of different size ranges.

The present invention contemplates that many changes and modifications may be made. Therefore, while forms of the improved coupling assembly have been shown and described, and a number of alternatives discussed, persons skilled in this art will readily appreciate that various additional changes and modifications may be made without departing from the scope of the invention, as defined and differentiated by the claims.

What is claimed is:

1. A conduit coupling assembly configured to clamp to a fluid conduit oriented about a longitudinal axis comprising:
    a first arcuate sleeve member;
    a second arcuate sleeve member;
    a connecting assembly coupling said first sleeve member to said second sleeve member and configured to tighten said first and second sleeve members to said fluid conduit from a non-actuated position to a tightened position;
    an arcuate gasket having a radial-split and configured to be positioned between said first and second sleeve members and said fluid conduit;
    said gasket having an outer arcuate surface;
    said first arcuate sleeve member having a first longitudinally extending edge, a second longitudinally extending edge, and a first inwardly-facing arcuate pocket curving about said longitudinal axis from said first longitudinally extending edge to said second longitudinally extending edge when said first and second sleeve members are in said tightened position, said first inwardly-facing arcuate pocket configured to receive a portion of said radial-split gasket;
    said first arcuate pocket having an inwardly-facing arcuate surface when said first and second sleeve members are in said tightened position comprising:
        a first arcuate portion, a second arcuate portion, and a third arcuate portion;
        said third arcuate portion positioned circumferentially between said first and second arcuate portions;
        said first arcuate portion positioned circumferentially between said first longitudinally extending edge and said third arcuate portion;
        said second arcuate portion positioned circumferentially between said second longitudinally extending edge and said third arcuate portion;
        said first arcuate portion having a maximum radius from said longitudinal axis;
        said second arcuate portion having a maximum radius from said longitudinal axis;
        said third arcuate portion having a minimum radius from said longitudinal axis;
        said maximum radius of said first arcuate portion being greater than said minimum radius of said third arcuate portion; and
        said maximum radius of said second arcuate portion being greater than said minimum radius of said third arcuate portion;
    said third arcuate portion of said inwardly-facing arcuate surface of said first arcuate pocket angularly aligned about said longitudinal axis relative to said radial-split of said arcuate gasket such that said third arcuate portion of said inwardly-facing arcuate surface extends circumferentially about said longitudinal axis from at least a first edge of said radial-split to a second edge of said radial split when the first and second sleeve members are in said tightened position;
    said second arcuate sleeve member having a first longitudinally extending edge, a second longitudinally extending edge, and a second inwardly-facing arcuate pocket curving about said longitudinal axis from said first longitudinally extending edge to said second longitudinally extending edge when said first and second sleeve members are in said tightened position, said second inwardly-facing arcuate pocket configured to receive a portion of said radial-split gasket;
    said second arcuate pocket having an inwardly-facing arcuate surface when said first and second sleeve members are in said tightened position comprising:
        a first arcuate portion, a second arcuate portion, and a third arcuate portion;
        said third arcuate portion positioned circumferentially between said first and second arcuate portions;
        said first arcuate portion positioned circumferentially between said first longitudinally extending edge and said third arcuate portion;
        said second arcuate portion positioned circumferentially between said second longitudinally extending edge and said third arcuate portion;
        said first arcuate portion having a maximum radius from said longitudinal axis;
        said second arcuate portion having a maximum radius from said longitudinal axis;
        said third arcuate portion having a minimum radius from said longitudinal axis;
        said maximum radius of said first arcuate portion being greater than said minimum radius of said third arcuate portion; and
        said maximum radius of said second arcuate portion being greater than said minimum radius of said third arcuate portion.

2. The conduit coupling assembly set forth in claim 1, wherein said outer arcuate surface of said gasket extends from said first edge of said radial-split to said second edge of said radial split and has a constant radius from said first edge of said radial-split to said second edge of said radial split when said first and second sleeve members are in said non-actuated position.

3. The conduit coupling assembly set forth in claim 1, comprising a first gap between said outer arcuate surface of said gasket and said first arcuate portions of said inwardly-facing arcuate surfaces of said first and second arcuate pockets of said first and second sleeve members when said first and second sleeve members are in said non-actuated position.

4. The conduit coupling assembly set forth in claim 3, comprising a second gap between said outer arcuate surface of said gasket and said second arcuate portions of said inwardly-facing arcuate surfaces of said first and second arcuate pockets of said first and second sleeve members when said first and second sleeve members are in said non-actuated position.

5. The conduit coupling assembly set forth in claim 1, wherein said third arcuate portion of said inwardly-facing arcuate surface of said first inwardly-facing arcuate pocket of said first sleeve member comprises a third non-circular arc about said longitudinal axis having a third arc angle about said longitudinal axis and a radius from said longitudinal axis ranging from said minimum radius of said third arcuate portion to a maximum radius of said third arcuate portion.

6. The conduit coupling assembly set forth in claim 5, wherein said third arcuate portion of said inwardly-facing arcuate surface of said first inwardly-facing arcuate pocket of said first sleeve member comprises a third circular arc about a third center axis offset radially from said longitudinal axis, said third circular arc having a constant radius from said third central axis that is less than said minimum radius of said third arcuate portion from said longitudinal axis and a third central axis arc angle greater than said third arc angle.

7. The conduit coupling assembly set forth in claim 1, wherein said first arcuate portion of said inwardly-facing arcuate surface of said first inwardly-facing arcuate pocket of said first sleeve member comprises a non-circular arc about said longitudinal axis having a first arc angle about said longitudinal axis and a radius from said longitudinal axis ranging from said maximum radius of said first arcuate portion to a minimum radius of said first arcuate portion.

8. The conduit coupling assembly set forth in claim 7, wherein said minimum radius of said first arcuate portion is greater than said minimum radius of said third arcuate portion.

9. The conduit coupling assembly set forth in claim 8, wherein said minimum radius of said first arcuate portion is equal to or greater than a maximum radius of said third arcuate portion from said longitudinal axis.

10. The conduit coupling assembly set forth in claim 7, wherein said first arcuate portion of said inwardly-facing arcuate surface of said first inwardly-facing arcuate pocket of said first sleeve member comprises a first circular arc about a first center axis offset radially from said longitudinal axis, said first circular arc having a constant radius from said first central axis that is less than said minimum radius of said first arcuate portion from said longitudinal axis and a first central axis arc angle greater than said first arc angle.

11. The conduit coupling assembly set forth in claim 10, wherein said second arcuate portion of said inwardly-facing arcuate surface of said first inwardly-facing arcuate pocket of said first sleeve member comprises a non-circular arc about said longitudinal axis having a second arc angle about said longitudinal axis and a radius from said longitudinal axis ranging from said maximum radius of said second arcuate portion to a minimum radius of said second arcuate portion.

12. The conduit coupling assembly set forth in claim 11, wherein said minimum radius of said second arcuate portion is greater than said minimum radius of said third arcuate portion.

13. The conduit coupling assembly set forth in claim 12, wherein said minimum radius of said second arcuate portion is equal to or greater than a maximum radius of said third arcuate portion from said longitudinal axis.

14. The conduit coupling assembly set forth in claim 11, wherein said second arcuate portion of said inwardly-facing arcuate surface of said first inwardly-facing arcuate pocket of said first sleeve member comprises a second circular arc about a second center axis offset radially from said longitudinal axis, said second circular arc having a constant radius from said second central axis that is less than said minimum radius of said second arcuate portion from said longitudinal axis and a second central axis arc angle greater than said second arc angle.

15. The conduit coupling assembly set forth in claim 1, wherein said connecting assembly coupling said first sleeve member to said second sleeve member comprises:
  a first connecting flange extending from said first arcuate sleeve member adjacent said first longitudinally extending edge of said first arcuate sleeve member;
  a second connecting flange extending from said first arcuate sleeve member adjacent said second longitudinally extending edge of said first arcuate sleeve member;
  a first connecting flange extending from said second arcuate sleeve member adjacent said first longitudinally extending edge of said second arcuate sleeve member;
  a second connecting flange extending from said second arcuate sleeve member adjacent said second longitudinally extending edge of said second arcuate sleeve member;
  a plurality of bolts extending from said first connecting flange of said first arcuate sleeve member to said first connecting flange of said second arcuate sleeve member; and
  a plurality of bolts extending from said second connecting flange of said first arcuate sleeve member to said second connecting flange of said second arcuate sleeve member.

16. The conduit coupling assembly set forth in claim 1, comprising a first longitudinally extending gasket disposed in a circumferential gap between said first longitudinally extending edge of said first arcuate sleeve member and said first longitudinally extending edge of said second arcuate sleeve member.

17. The conduit coupling assembly set forth in claim 16, comprising a second longitudinally extending gasket disposed in a circumferential gap between said second longitudinally extending edge of said first arcuate sleeve member and said second longitudinally extending edge of said second arcuate sleeve member.

18. The conduit coupling assembly set forth in claim 1, wherein said arcuate gasket comprises a radial-split arcuate outer gasket layer and a separate radial-split arcuate inner gasket layer;
  said outer gasket layer having an inner circumferential surface and an outer circumferential surface;
  said inner gasket layer having an inner circumferential surface and an outer circumferential surface; and said inner and outer gasket layers configured to be selectively disengaged from each other.

19. The conduit coupling assembly set forth in claim 18, wherein said outer circumferential surface of said inner gasket layer comprises a plurality of radially protruding circumferentially spaced spokes and said inner circumferential surface of said outer gasket layer comprises a plurality of circumferentially spaced cavities configured to receive said protruding circumferentially spaced spokes of said inner gasket layer to maintain said angular alignment of said outer gasket and said inner gasket layer about said longitudinal axis.

20. The coupling assembly set forth in claim 18, wherein:
   said inner circumferential surface of said outer gasket ring comprises a plurality of inwardly extending circumferential channels therein;
   said outer circumferential surface of said inner gasket ring comprises a plurality of outwardly extending circumferential splines; and
   said circumferential channels of said outer gasket ring are configured to receive said circumferential splines of said inner gasket ring.

21. A conduit coupling assembly configured to clamp to a fluid conduit oriented about a longitudinal axis comprising:
   a first arcuate sleeve member;
   a second arcuate sleeve member;
   a connecting assembly coupling said first sleeve member to said second sleeve member and configured to tighten said first and second sleeve members to said fluid conduit from a non-actuated position to a tightened position;
   an arcuate gasket having a radial-split and configured to be positioned between said first and second sleeve members and said fluid conduit;
   said gasket having an outer arcuate surface;
   said first arcuate sleeve member having a first longitudinally extending edge, a second longitudinally extending edge, and a first inwardly-facing arcuate pocket curving about said longitudinal axis from said first longitudinally extending edge to said second longitudinally extending edge when said first and second sleeve members are in said tightened position, said first inwardly-facing arcuate pocket configured to receive a portion of said radial-split gasket;
   said first arcuate pocket having an inwardly-facing arcuate surface when said first and second sleeve members are in said tightened position;
   said inwardly-facing arcuate surface of said first arcuate pocket have a non-uniform radius from said longitudinal axis between said first longitudinally extending edge and said second longitudinally extending edge of said first arcuate sleeve member;
   said inwardly-facing arcuate surface of said first arcuate pocket comprising a first arcuate portion, a second arcuate portion, and a third arcuate portion positioned circumferentially between said first and second arcuate portions;
   said third arcuate portion of said inwardly-facing arcuate surface of said first arcuate pocket angularly aligned about said longitudinal axis relative to said radial-split of said arcuate gasket such that said third arcuate portion of said inwardly-facing arcuate surface extends circumferentially about said longitudinal axis from at least a first edge of said radial-split to a second edge of said radial split when the first and second sleeve members are in said tightened position;
   said second arcuate sleeve member having a first longitudinally extending edge, a second longitudinally extending edge, and a second inwardly-facing arcuate pocket curving about said longitudinal axis from said first longitudinally extending edge to said second longitudinally extending edge when said first and second sleeve members are in said tightened position, said second inwardly-facing arcuate pocket configured to receive a portion of said radial-split gasket;
   said second arcuate pocket having an inwardly-facing arcuate surface when said first and second sleeve members are in said tightened position;
   said inwardly-facing arcuate surface of said second arcuate pocket have a non-uniform radius from said longitudinal axis between said first longitudinally extending edge and said second longitudinally extending edge of said second arcuate sleeve member.

22. The coupling assembly set forth in claim 21, wherein said non-uniform radius of said inwardly-facing arcuate surface of said first arcuate pocket ranges from a minimum radius to a maximum radius and said non-uniform radius of said inwardly-facing arcuate surface of said second arcuate pocket ranges from a minimum radius to a maximum radius.

23. The coupling assembly set forth in claim 22, wherein maximum radius of said inwardly-facing arcuate surface of said first arcuate pocket is at a circumferential position about said longitudinal axis that is between said first longitudinally extending edge of said first arcuate sleeve member and a circumferential position about said longitudinal axis of said minimum radius of said inwardly-facing arcuate surface of said first arcuate pocket.

24. The coupling assembly set forth in claim 23, wherein maximum radius of said inwardly-facing arcuate surface of said second arcuate pocket is at a circumferential position about said longitudinal axis that is between said first longitudinally extending edge of said second arcuate sleeve member and a circumferential position about said longitudinal axis of said minimum radius of said inwardly-facing arcuate surface of said second arcuate pocket.

* * * * *